(12) United States Patent
Baba et al.

(10) Patent No.: US 9,739,985 B2
(45) Date of Patent: Aug. 22, 2017

(54) PROJECTION LENS AND PROJECTION DISPLAY APPARATUS

(71) Applicant: FUJIFILM Corporation, Tokyo (JP)

(72) Inventors: Tomoyuki Baba, Saitama-ken (JP);
Yukiko Nagatoshi, Saitama-ken (JP);
Masanao Kawana, Saitama-ken (JP);
Masaru Amano, Saitama-ken (JP);
Akiko Nagahara, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 319 days.

(21) Appl. No.: 14/690,598

(22) Filed: Apr. 20, 2015

(65) Prior Publication Data

US 2015/0323766 A1 Nov. 12, 2015

(30) Foreign Application Priority Data

May 8, 2014 (JP) .................. 2014-096664

(51) Int. Cl.
| G02B 9/00 | (2006.01) |
| G02B 13/18 | (2006.01) |
| G02B 13/16 | (2006.01) |
| G02B 15/177 | (2006.01) |
| G02B 3/02 | (2006.01) |

(52) U.S. Cl.
CPC .............. *G02B 13/18* (2013.01); *G02B 3/02* (2013.01); *G02B 13/16* (2013.01); *G02B 15/177* (2013.01)

(58) Field of Classification Search
CPC .. G02B 15/173; G02B 13/009; G02B 15/177; G02B 27/646; G02B 13/0045

USPC ....... 359/649, 708, 716, 745, 748, 749, 754, 359/784, 641, 648, 650, 672–706

See application file for complete search history.

(56) References Cited

U.S. PATENT DOCUMENTS

| 2003/0165019 A1 | 9/2003 | Yamamoto |
| 2004/0076417 A1* | 4/2004 | Miyatake ............. G02B 15/177 396/72 |
| 2004/0202822 A1* | 10/2004 | Bourdelais ................ B32B 7/02 428/143 |
| 2009/0046379 A1* | 2/2009 | Kuramoto ................ G02B 3/00 359/718 |
| 2011/0013151 A1* | 1/2011 | Nagahara ............. G02B 15/177 353/101 |
| 2011/0105638 A1* | 5/2011 | Kawabe ................ C08F 212/00 522/182 |

FOREIGN PATENT DOCUMENTS

| JP | 2002-072094 | 3/2002 |
| JP | 3487468 | 1/2004 |
| JP | 2005-084352 | 3/2005 |
| JP | 4060075 | 3/2008 |

* cited by examiner

*Primary Examiner* — Bumsuk Won
*Assistant Examiner* — Tamara Y Washington
(74) *Attorney, Agent, or Firm* — Young & Thompson

(57) ABSTRACT

A projection lens includes a compound aspherical lens in which a resin layer is formed on a surface of a glass lens and a lens surface of the resin layer on the air contacting surface side has an aspherical shape. If the glass transition temperature of the resin layer is taken as Tg and its unit is taken as ° C., Tg of at least one of the resin layers is 150<Tg<280. The projection lens is configured to satisfy a given conditional expression with respect to the at least one of the resin layers.

12 Claims, 16 Drawing Sheets

EXAMPLE 1

EXAMPLE 1

FIG.4
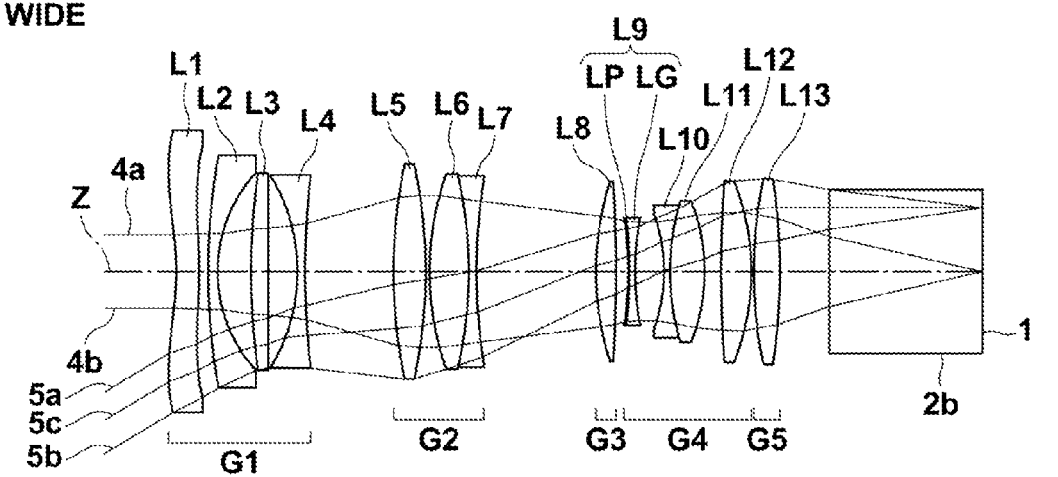
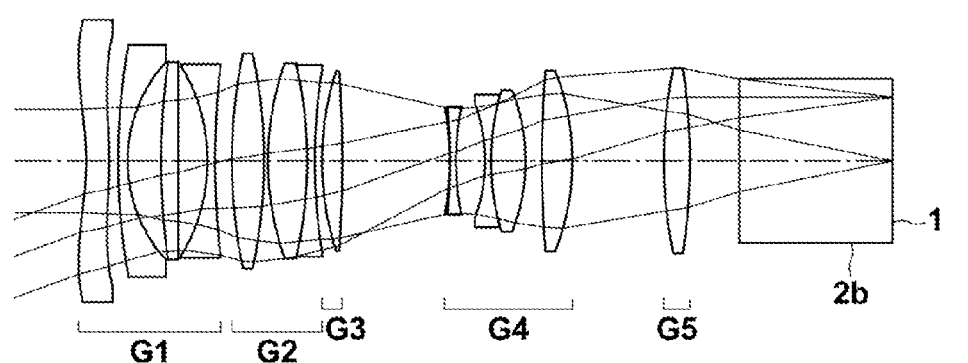

FIG.5 EXAMPLE 3

FIG.8 EXAMPLE 6

PROJECTION LENS AND PROJECTION DISPLAY APPARATUS

CROSS-REFERENCE TO RELATED APPLICATIONS

The present application claims priority under 35 U.S.C. §119 to Japanese Patent Application No. 2014-096664 filed on May 8, 2014. The above application is hereby expressly incorporated by reference, in its entirety, into the present application.

BACKGROUND OF THE INVENTION

Field of the Invention

The present invention relates to a projection lens and a projection display apparatus, and more particularly to a projection lens suitable for magnifying and projecting an original image formed, for example, by a light valve, and a projection display apparatus using the same.

Description of the Related Art

Heretofore, projection display devices (projectors) that magnify and project images displayed on image display surfaces of light valves, such as a liquid crystal display device, a DMD (Digital Micro-mirror Device: registered trade mark), and the like, have been used when conducting presentations and the like. When an image is projected, it is preferable that the contour of the magnified projected image on the screen is not distorted and there is no color shift in a peripheral portion of the magnified projected image. To that end, the projection lens is required to have a high resolving power with well-corrected distortion and lateral chromatic aberration. Further, from the viewpoint of downsizing, light-weighting, and cost reduction, the number of lenses of a projection lens needs to be as small as possible on the condition that the projection lens satisfies required specifications and performance. Further, there has recently been an increasing demand for wide angle lenses because large screen sizes with short projection distances are often required. To meet these needs, projection lenses that use an aspherical lens having a high aberration correction effect are proposed as described, for example, in Japanese Unexamined Patent Publication No. 2002-072094, Japanese Patent No. 3487468, Japanese Unexamined Patent Publication No. 2005-084352, and Japanese Patent No. 4060075.

SUMMARY OF THE INVENTION

Aspherical lenses may include a glass lens whose lens surface is formed in an aspherical shape (hereinafter, a glass aspherical lens), a plastic lens whose lens surface is formed in an aspherical shape (hereinafter, a plastic aspherical lens), and a lens in which a thin resin layer is formed on a lens surface of a glass lens and a lens surface of the resin layer on the air contacting surface side is formed in an aspherical shape (hereinafter, a compound aspherical lens). But, the glass aspherical lens has a problem of high cost, while the plastic aspherical lens has a problem of large performance change due to temperature change in comparison with the glass aspherical lens. Generally, the compound aspherical lens can be manufactured inexpensively in comparison with the glass aspherical lens and has a small performance change due to temperature change in comparison with the plastic aspherical lens, but a care must be taken when used in a high temperature as it includes a resin layer.

Normally, projection display devices are configured such that the exit pupil position of the illumination optical system substantially corresponds to the reduction side pupil position of the projection lens in order to improve light usage efficiency. In such a configuration, the intersection between the principal ray of the projection lens and the optical axis or near the intersection corresponds to a conjugate position of a secondary light source generated by an integrator used in the illumination optical system and the temperature tends to be increased. Therefore, if a lens is disposed at such a position, it is necessary to select a material having excellent heat resistance. Further, higher brightness projection display devices have been demanded in recent years and light sources of higher brightness than before have been used for that purpose. Therefore, the temperature may possibly be increased also at places other than the foregoing intersection between the principal ray and the optical axis or near the intersection inside of such a high brightness projection display device.

If a plastic aspherical lens or a compound aspherical lens for which no heat resistance is considered is disposed at a position which becomes a high temperature, not only the performance may be changed due to a high temperature but also the property of the lens may possibly be changed, and the projection performance of the projection lens is impaired. Japanese Unexamined Patent Publication No. 2002-072094, Japanese Patent No. 3487468, and Japanese Unexamined Patent Publication No. 2005-084352 describe projection lenses that employ an aspherical lens, but none of them provides a description that temperature change or heat resistance is taken into account. Japanese Patent No. 4060075 describes that the problem of optical property change in a plastic lens due to temperature change is alleviated by the use of two compound aspherical lenses having positive and negative surface refractive powers respectively, but no description is found for heat resistance that allows the projection lens to be used in a recently demanded high brightness projection display device.

The present invention has been developed in view of the circumstances described above, and it is an object of the present invention to provide a projection lens having heat resistance which is sufficient for use in a recently demanded high brightness projection display device, while including a compound aspherical lens and realizing a configuration which is advantageous in terms of cost and favorable optical performance. It is a further object of the present invention to provide a projection display apparatus equipped with the foregoing projection lens.

A projection lens of the present invention includes a compound aspherical lens in which a resin layer is formed on a surface of a glass lens and a lens surface of the resin layer on the air contacting surface side has an aspherical shape, and satisfies conditional expressions (1) and (2) given below with respect to at least one of the resin layers:

$$150 < Tg < 280 \quad (1)$$

$$\frac{\sqrt{\phi Da \cdot |d|}}{\phi Ds} < 3.3. \quad (2)$$

where,

Tg: glass transition temperature of the resin layer, in unit of °C.;

ΦDa: effective diameter of the lens surface of the resin layer on the air contacting surface side;

d: distance on the optical axis from the intersection between the outermost off-axis principal ray and the optical axis to the lens surface of the resin layer on the air contacting surface side in a case where the intersection is in the air, or distance on the optical axis from a lens surface closest to the intersection in an optical axis direction to the lens surface of the resin layer on the air contacting surface side in a case where the intersection is not in the air; and ΦDs: twice the axial marginal ray height at the position of the intersection between the outermost off-axis principal ray and the optical axis in a case where the intersection is in the air, or an effective diameter of a lens surface closest to the intersection in an optical axis direction in a case where the intersection is not in the air, in which, in a case where the projection lens is a variable magnification optical system, ΦDa, d, and ΦDs are in a magnification state in which the F-number of the entire system is minimized.

The projection lens of the present invention preferably satisfies a conditional expression (1') given below, instead of the conditional expression (1) described above, and the projection lens of the present invention preferably satisfies a conditional expression (2') given below, instead of the conditional expression (2) described above:

$$160 < Tg < 250 \quad (1')$$

$$\frac{\sqrt{\phi Da \cdot |d|}}{\phi Ds} < 2.0. \quad (2')$$

Further, the projection lens of the present invention preferably satisfies any one or any combination of conditional expressions (3) to (6), (3'), (5'), and (6') given below:

$$\Phi Da/\Phi Ds < 2.5 \quad (3)$$

$$\Phi Da/\Phi Ds < 2.0 \quad (3')$$

$$10 < \Phi DP \quad (4)$$

$$1 \leq \Phi DP/\Phi DLmin < 2.0 \quad (5)$$

$$1 \leq \Phi DP/\Phi DLmin < 1.5 \quad (5')$$

$$0.4 < Zr \cdot y/(Fmin \cdot f) \quad (6)$$

$$0.45 < Zr \cdot y/(Fmin \cdot f) \quad (6')$$

where,

ΦDP: maximum effective diameter of the lens surface of the resin layer on the air contacting surface side, in unit of millimeter;

ΦDLmin: minimum effective lens diameter in the entire system;

Zr: value of 1 in a case where the projection lens is a fixed focus optical system, or zoom ratio in a case where the projection lens is a variable magnification optical system;

y: maximum image height in a case where the reduction side is taken as the image side;

Fmin: F-number of the entire system in a case where the projection lens is a fixed focus optical system, or minimum F-number in a case where the projection lens is a variable magnification optical system; and f: focal length of the entire system in a case where the projection lens is a fixed focus optical system, or focal length of the entire system at the wide angle end in a case where the projection lens is a variable magnification optical system, in which, in a case where the projection lens is a variable magnification optical system, ΦDP is a value in a magnification state in which ΦDP takes a maximum value of those which can be taken by ΦDP and ΦDLmin is a value in a magnification state in which ΦDLmin takes a minimum value of those which can be taken by ΦDLmin.

In a case where the projection lens of the present invention is a fixed focus optical system, the projection lens preferably satisfies a conditional expression (7) given below and more preferably satisfies a conditional expression (7') given below:

$$0.3 < Bf/|exP| < 1.0 \quad (7)$$

$$0.4 < Bf/|exP| < 1.0 \quad (7')$$

where,

Bf: air equivalent distance on the optical axis from the most reduction side lens surface to the reduction side focal position of the entire system; and exP: distance from the reduction side focal position of the entire system to the reduction side pupil position.

A projection display apparatus of the present invention includes a light source, a light valve that receives light from the light source, and the projection lens of the present invention, as a projection lens that projects an optical image formed by light optically modulated by the light valve onto a screen.

In the projection lens of the present invention, the term "magnification side" refers to the projected side (screen side) and the screen side is referred to as the magnification side even in a case where a reduced projection is performed for convenience. Further, in the projection lens of the present invention, the term "reduction side" refers to the original image display area side (light valve side) and the light valve side is referred to as the reduction side even in a case where a reduced projection is performed for convenience.

The foregoing "compound aspherical lens" in the projection lens of the present invention is also referred to as a hybrid aspherical lens or a replica aspherical lens. The compound aspherical lens is a lens manufactured, for example, by forming a thin resin layer on a surface of a glass lens by molding and forming the lens surface of the resin layer on the air contacting surface side in an aspherical surface. That is, it is a lens integrally formed of a glass lens and a resin layer and functions as one aspherical lens as a whole. Therefore, the foregoing "compound aspherical lens" in the projection lens of the present invention differs from a cemented lens manufactured by separately forming a glass lens and a resin lens, and cementing them together with a cementing agent.

According to the present invention, the projection lens includes a compound aspherical lens made of a glass lens and a resin layer, and is configured to satisfy predetermined conditional expressions with respect to the resin layer. This allows a projection lens having heat resistance which is sufficient for use in a recently demanded high brightness projection display device, while realizing a configuration which is advantageous in terms of cost and favorable optical performance, and a projection display apparatus equipped with the projection display apparatus to be provided.

BRIEF DESCRIPTION OF THE DRAWINGS

FIG. 4 is a cross-sectional view of a projection lens of Example 2 of the present invention, illustrating a configuration thereof and light rays, in which the upper side illustrates the projection lens in the wide angle end state and the lower side illustrates the projection lens in the telephoto end state.

DETAILED DESCRIPTION OF THE PREFERRED EMBODIMENTS

Figure 1:
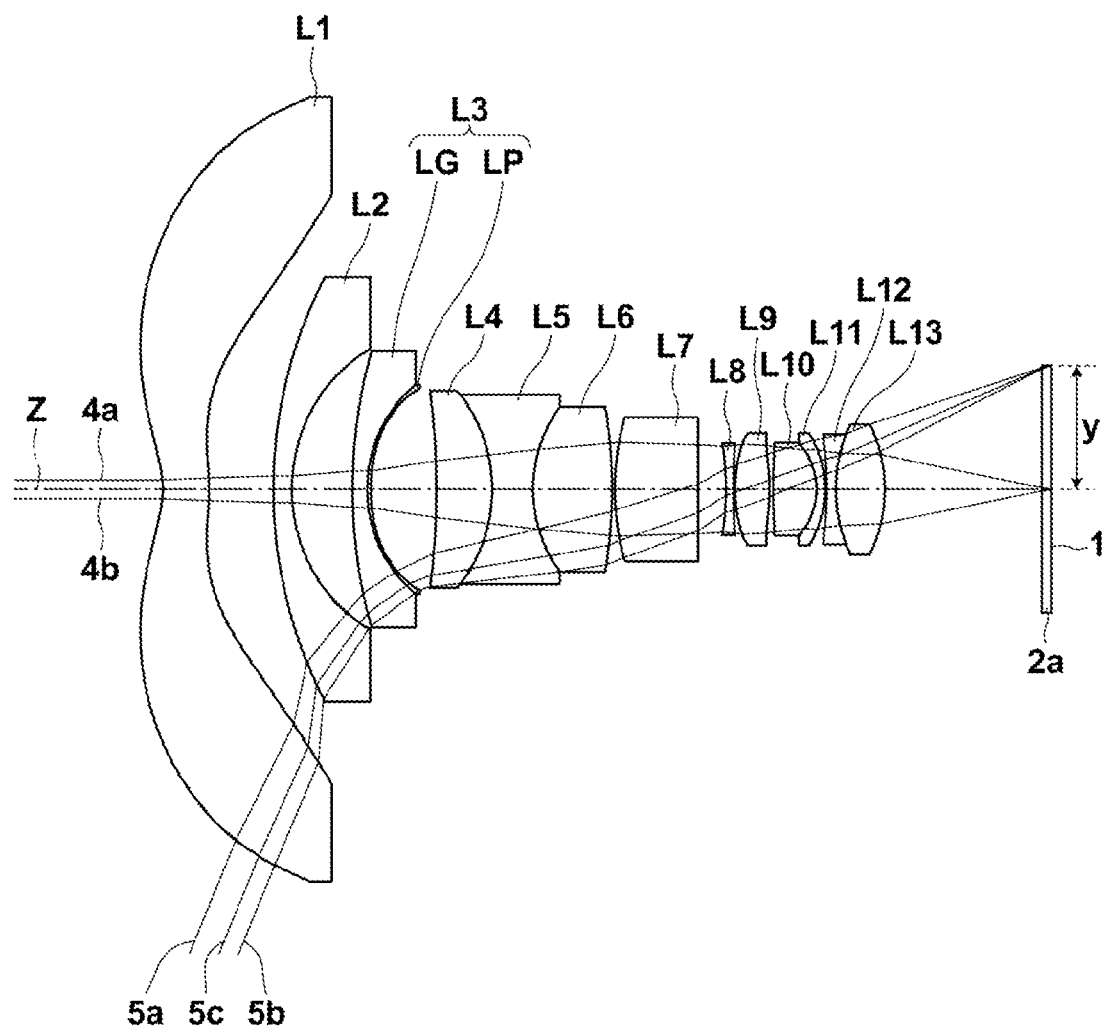
FIG. 1 is a cross-sectional view of a projection lens of Example 1 of the present invention, illustrating a configuration thereof and light rays.
Figure 2:
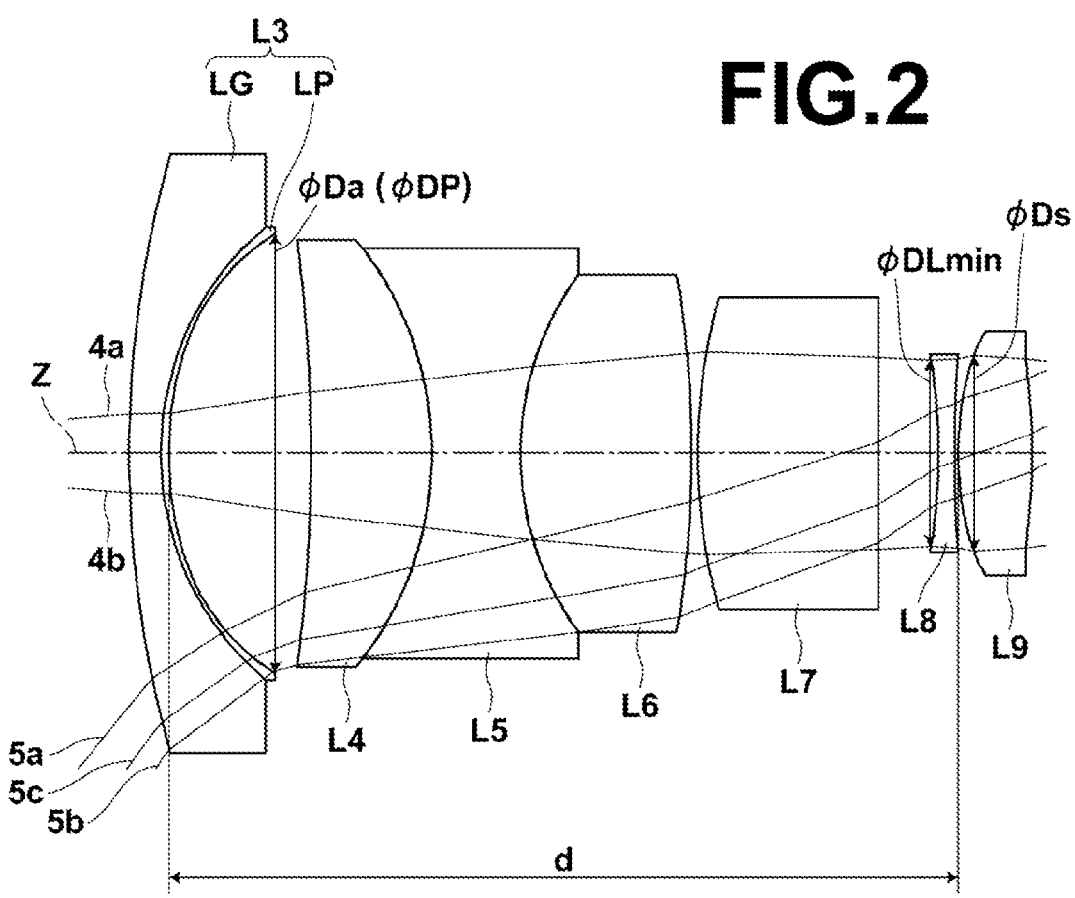
FIG. 2 is a partially enlarged view of the projection lens illustrated in FIG. 1.
Figure 3:
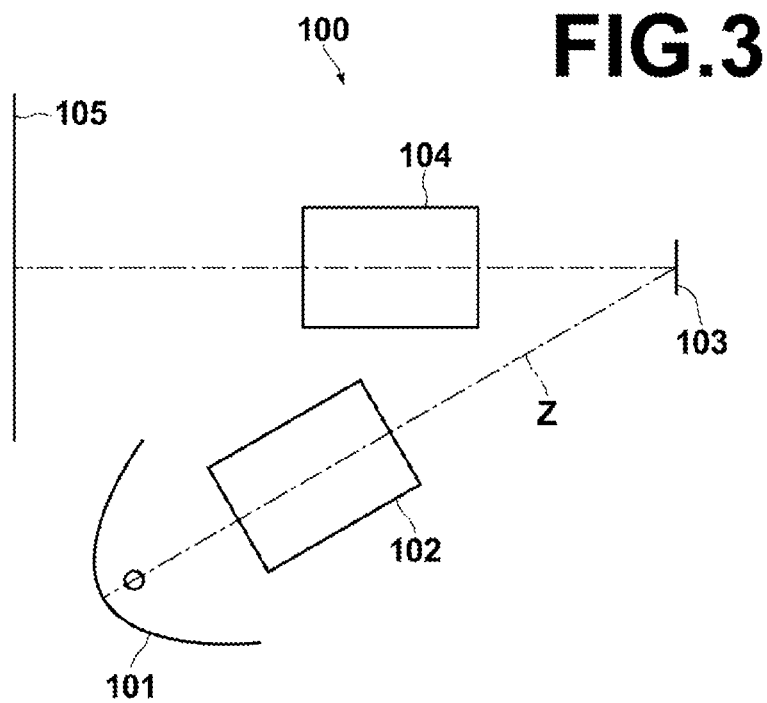
FIG. 3 is a schematic configuration diagram of a projection display apparatus according to an embodiment of the present invention.

Hereinafter, embodiments of the present invention will be described in detail with reference to the accompanying drawings. FIG. 1 shows a cross-sectional view of a projection lens according to an embodiment of the present invention, and FIG. 2 shows an enlarged view of a relevant part of the projection lens of FIG. 1. The example shown in FIG. 1 corresponds to a projection lens of Example 1, to be described later. FIG. 3 shows a schematic configuration diagram of a projection display apparatus according to an embodiment of the present invention.

A projection display apparatus according to an embodiment of the present invention will be described first, with reference to FIG. 3. The projection display apparatus 100 illustrated in FIG. 3 includes a light source 101, an illumination optical system 102, a DMD 103 as a light valve, and a projection lens 104 according to an embodiment of the present invention. A light beam outputted from the light source 101 is selected and converted to each of three primary color components (R, G, B) in a time series manner by a color wheel (not shown) and inputted to the DMD 103 after the intensity distribution of each light component is uniformed across a cross-section perpendicular to the optical axis Z of the light beam by the illumination optical system 102. Based on the change in color of the inputted light, the modulation switching is performed for the colored light in the DMD 103. The light optically modulated by the DMD 103 is inputted to the projection lens 104. The apparatus is configured such that the exit pupil position of the illumination optical system 102 substantially corresponds to the entrance pupil position of the projection lens 104 (corresponding to the reduction side pupil position of the projection lens 104). The optical image formed by the optically modulated light is projected onto a screen 105 by the projection lens 104.

Next, a configuration of a projection lens according to an embodiment of the present invention will be described with reference to FIGS. 1 and 2. In FIGS. 1 and 2, the left side corresponds to the magnification side and the right side corresponds to the reduction side. FIGS. 1 and 2 also illustrate an upper side axial marginal ray 4a, a lower side axial marginal ray 4b, an upper side outermost off-axis marginal ray 5a, a lower side outermost off-axis marginal ray 5b, and an outermost off-axis principal ray 5c. The marginal ray is also referred to as the maximum ray and the outermost off-axis principal ray is the principal ray of off-axis rays related to the maximum image height. FIG. 1 also illustrates a parallel-plate-like filter 2a and an image display surface 1 of the light valve located on the reduction side surface of the filter 2a, on the assumption that the projection lens is mounted in a projection display apparatus.

FIG. 1 illustrates an example in which the position of the reduction side surface of the filter 2a corresponds to the position of the image display surface 1, but not necessarily limited to this. Further, FIG. 1 illustrates only one image display surface 1, but the projection display apparatus may be configured so as to be able to display a full color image by separating a light beam from the light source into three primary colors by a color separation optical system and disposing three light valves for the respective colors.

The projection lens according to the present invention is configured to include at least one compound aspherical lens in which a resin layer is formed on at least one surface of a glass lens and a lens surface of the resin layer on the air contacting surface side has an aspherical shape. The glass lens of the compound aspherical lens is preferably a spherical lens having no aspherical surface on the lens surfaces and such a case is advantageous in terms of cost.

For example, the example projection lens illustrated in FIG. 1 is a fixed focus optical system and is composed of 13 lenses, lenses L1 to L13, in order from the magnification side, in which the lens L3 is a compound aspherical lens. The lens L3 is composed of a glass lens LG, which is a spherical lens, and a resin layer LP formed on the reduction side surface of the glass lens LG. The lens surface of the resin layer LP opposite to the glass lens, i.e., the reduction side lens surface, which is the surface on the air contacting surface side, is formed in an aspherical shape.

FIG. 1 illustrates an example compound aspherical lens in which the resin layer is formed only on one surface of the glass lens, but the compound aspherical lens according to the present invention may have resin layers on both surfaces of the glass lens, each lens surface on the air contacting surface side having an aspherical shape. Further, the glass lens of the compound aspherical lens according to the present invention may be a lens having substantially no refractive power.

The projection lens of the present invention may be a fixed focus optical system or a variable magnification optical system. In a case where the projection optical system of the present invention is a fixed focus optical system, the use of the compound aspherical lens according to the present invention as the most magnification side lens is advantageous for realizing a wide angle lens system often demanded in the fixed focus optical system projection lenses. This is because the use of an aspherical lens as the most magnification side lens is advantageous for the correction of distortion which is a big problem in the wide angle lens system. Further, the most magnification side lens in the wide angle lens system tends to be a lens having a large diameter and the use of the compound aspherical lens as the most magnification side lens, instead of a glass aspherical lens, is advantageous in terms of cost. In a case where the projection lens of the present invention is a variable magnification optical system, it is advantageous to configure the optical system such that the lens group moved during magnification change includes the compound aspherical lens according to the present invention for realizing a higher performance lens system, since the aspherical lens may be disposed at a position where a greater field curvature correction effect can be obtained.

Preferably, a high heat resistant thermosetting resin is used as the material of the compound aspherical lens according to the present invention. At least one resin layer of the compound aspherical lens according to the present invention satisfies a conditional expression (1) given below:

$$150 < Tg < 280 \quad (1)$$

where,

Tg: glass transition temperature of the resin layer, in unit of ° C.

In the present invention, the glass transition temperature Tg is measured in the following manner. First, a measurement resin layer is produced with a size of 5 mm×30 mm by forming a film of the same material as that of the resin layer and thermally curing the film at a high temperature under a nitrogen atmosphere. After subjecting the measurement resin layer to humidity conditioning at 25° C. and 60% RH (relative humidity) for two hours or more, the viscoelasticity of the resin layer is measured by a dynamic viscoelasticity measuring device (Vibron, DVA-225 (manufactured by ITK Co., Ltd)) with a distance between grips (gripping points) of 20 mm, a temperature increase rate of 2° C./min, a measuring temperature range from 30° C. to 200° C., and a frequency of 1 Hz, and plotting the results by taking storage modulus on the vertical axis in logarithmic scale and temperature in ° C. on the horizontal axis in linear scale. A sharp decline in storage modulus observed when the storage modulus transfers from the solid region to the glass transition region is detected and with this temperature as the boundary, a first straight line is drawn by the plots in the solid region while a second straight line is drawn by the plots in the glass transition region and an intersection between the first and the second straight lines is obtained. The temperature at the intersection is the temperature at which the storage modulus declines sharply and the resin layer begins to soften during heating and this temperature is defined as the glass transition temperature Tg of the resin layer.

By selecting a material for the resin layer so as not to fall to or below the lower limit of the conditional expression (1), even in a case where the compound aspherical lens is used in a recently demanded high brightness projection display device, degradation in the resolution performance of the projection lens and deterioration in the coating formed on the resin layer due to a property change and a deformation of the resin layer caused by heat from the light source may be prevented. By selecting a material of the resin layer so as not to reach or exceed the upper limit of the conditional expression (1), a material which is fragile to temperature changes may be avoided and cracking in the resin layer due to repeated temperature changes may be prevented. By satisfying the conditional expression (1), degradation in the performance of the projection lens due to heat from the light source may be prevented, even in a case where the projection lens is used in a recently demanded high brightness projection display device.

In order to further enhance the aforementioned effects of the conditional expression (1), the projection lens more preferably satisfies a conditional expression (1') given below:

$$160 < Tg < 250 \quad (1').$$

Further, in the present projection lens, at least one resin layer forming the compound aspherical lens according to the present invention and satisfying the conditional expression (1) satisfies a conditional expression (2) given below:

$$\frac{\sqrt{\phi Da \cdot |d|}}{\phi Ds} < 3.3 \quad (2)$$

where,

ΦDa: effective diameter of the lens surface of the resin layer on the air contacting surface side;

d: distance on the optical axis from the intersection between the outermost off-axis principal ray and the optical axis to the lens surface of the resin layer on the air contacting surface side in a case where the intersection is in the air, or distance on the optical axis from a lens surface closest to the intersection in an optical axis direction to the lens surface of the resin layer on the air contacting surface side in a case where the intersection is not in the air; and ΦDs: twice the axial marginal ray height at the position of the intersection between the outermost off-axis principal ray and the optical axis in a case where the intersection is in the air, or an effective diameter of a lens surface closest to the intersection in an optical axis direction in a case where the intersection is not in the air, in which, in a case where the projection lens is a variable magnification optical system, ΦDa, d, and ΦDs are in a magnification state in which the F-number of the entire system is minimized.

In a case where ΦDa takes a plurality of values in a magnification state in which the F-number of the entire system is minimized, such as a case where the projection lens includes a variable stop whose aperture diameter is variable, the conditional expression (2) is calculated using a minimum value ΦDa can take in a magnification state in which the F-number of the entire system is minimized in the present invention. Likewise, in a case where ΦDs takes a plurality of values in a magnification state in which the F-number of the entire system is minimized, the conditional expression (2) is calculated using a minimum value ΦDs can take. Further, ΦDa, d, and ΦDs are those in the state in which the projection distance is infinity. The outermost off-axis principal ray can be determined based on any one of the aperture position, magnification side pupil position, and reduction side pupil position of the projection lens. The effective diameter of a lens surface refers to the diameter of an effective light beam on the lens surface and the effective light beam is the light beam used in imaging. The same applies to the maximum effective diameter of the resin layer and the lens effective diameter of the resin layer to be described later.

FIG. 2 shows a partially enlarged view of the projection lens shown in FIG. 1, illustrating the lenses L3 to L9 and light rays passing through these lenses. The position of the intersection between the outermost off-axis principal ray 5c and the optical axis Z involved in d of the conditional expression (2) is located at a position where light rays are concentrated, and the temperature tends to increase as the distance from the position decreases. Further, ΦDa and ΦDs are related to the effective diameter, and as ΦDa becomes large with respect to ΦDs, the diameter of the resin layer becomes large in comparison with ΦDs, and the density of light rays on the resin layer is low in comparison with the density of light rays at the position of the intersection between the outermost off-axis principal ray 5c and the optical axis Z, so that the temperature of the resin layer is unlikely to increase. By disposing the compound aspherical lens such that the projection lens is configured to satisfy the conditional expression (2), the projection lens may have a configuration which is advantageous in terms of both cost and heat resistance. That is, if the "lens surface of the resin layer on the air contacting surface side" found in the foregoing definitions of ΦDa and d is changed to "lens surface of the aspherical lens on the air contacting surface side", and considering a configuration in which an aspherical lens that satisfies the conditional expression (2) is disposed, the projection lens may have a configuration which is advantageous in terms of both cost and heat resistance by selecting, as the aspherical lens, neither a plastic aspherical lens nor a glass aspherical lens, but a compound aspherical lens.

In order to further enhance the aforementioned effects of the conditional expression (2), the projection lens preferably satisfies a conditional expression (2') given below, and more preferably satisfies a conditional expression (2") given below in order to still further enhance the effects of the conditional expression (2):

$$\frac{\sqrt{\phi Da \cdot |d|}}{\phi Ds} < 2.0 \qquad (2')$$

$$\frac{\sqrt{\phi Da \cdot |d|}}{\phi Ds} < 1.5. \qquad (2'')$$

The projection lens preferably satisfies a conditional expression (3) given below with respect to ΦDa and ΦDs of at least one resin layer that satisfies the foregoing conditional expressions (1) and (2):

$$\Phi Da/\Phi Ds < 2.5 \qquad (3).$$

By disposing the compound aspherical lens such that the projection lens is configured to satisfy the conditional expression (3), the projection lens may have a configuration which is advantageous in terms of both cost and heat resistance.

In order to further enhance the aforementioned effects of the conditional expression (3), the projection lens preferably satisfies a conditional expression (3') given below, and more preferably satisfies a conditional expression (3") given below in order to still further enhance the effects of the conditional expression (3):

$$\Phi Da/\Phi Ds < 2.0 \qquad (3')$$

$$\Phi Da/\Phi Ds < 1.5 \qquad (3'').$$

The projection lens preferably satisfies a conditional expression (4) given below with respect to at least one resin layer that satisfies the foregoing conditional expressions (1) and (2). By setting the size of the resin layer so as not to fall to or below the lower limit of the conditional expression (4), the projection lens may have a configuration which is advantageous in terms of cost in comparison with a case where a glass aspherical lens is used.

$$10 < \Phi DP \qquad (4)$$

where,

ΦDP: maximum effective diameter of the lens surface of the resin layer on the air contacting surface side, in unit of millimeter, in which, in a case where the projection lens is a variable magnification optical system, ΦDP is a value in a magnification state in which ΦDP takes a maximum value of those which can be taken by ΦDP.

Further, the projection lens preferably satisfies a conditional expression (5) given below with respect to at least one resin layer that satisfies the foregoing conditional expressions (1) and (2):

$$1 \leq \Phi DP/\Phi DLmin < 2.0 \qquad (5)$$

where,

ΦDLmin: minimum effective lens diameter in the entire system, in which, in a case where the projection lens is a variable magnification optical system, ΦDLmin is a value in a magnification state in which ΦDLmin takes a minimum value of those which can be taken by ΦDLmin. Note that ΦDP in the conditional expression (5) is the same as ΦDP in the conditional expression (4).

Since ΦDP is greater than or equal to ΦDLmin, the lower limit of the conditional expression (5) is 1. By disposing the compound aspherical lens such that the projection lens is configured not to reach or exceed the upper limit of the conditional expression (5), the projection lens may have a configuration which is advantageous in terms of both cost and heat resistance.

In order to further enhance the aforementioned effects of the conditional expression (5), the projection lens preferably satisfies a conditional expression (5') given below, and more preferably satisfies a conditional expression (5") given below in order to still further enhance the effects of the conditional expression (5):

$$1 \le \Phi DP/\Phi DL\min < 1.5 \quad (5')$$

$$1 \le \Phi DP/\Phi DL\min < 1.35 \quad (5'').$$

Still further, the projection lens preferably satisfies a conditional expression (6) given below:

$$0.4 < Zr \cdot y/(F\min \cdot f) \quad (6)$$

where,

Zr: value of 1 in a case where the projection lens is a fixed focus optical system, or zoom ratio in a case where the projection lens is a variable magnification optical system;

y: maximum image height in a case where the reduction side is taken as the image side;

Fmin: F-number of the entire system in a case where the projection lens is a fixed focus optical system, or minimum F-number in a case where the projection lens is a variable magnification optical system; and f: focal length of the entire system in a case where the projection lens is a fixed focus optical system, or focal length of the entire system at the wide angle end in a case where the projection lens is a variable magnification optical system.

By configuring the projection lens not to fall to or below the lower limit of the conditional expression (6), the achievable degree of difficulty in the specifications of the projection lens is increased, and it is effective to use a compound aspherical lens that takes into account the heat resistance as in the present invention. By satisfying the conditional expression (6), a projection lens that meets the specifications of high user-friendliness may be realized by the use of a compound aspherical lens that takes into account the heat resistance, as in the present invention.

In order to further enhance the aforementioned effects of the conditional expression (6), the projection lens preferably satisfies a conditional expression (6') given below. Further, the projection lens preferably satisfies a conditional expression (6") given below. By configuring the projection lens so as not to reach or exceed the upper limit of the conditional expression (6"), the degree of difficulty in the specifications of the projection lens is prevented from being excessively raised or the lens system is prevented from being increased.

$$0.45 < Zr \cdot y/(F\min \cdot f) \quad (6')$$

$$0.45 < Zr \cdot y/(F\min \cdot f) \le 1.50 \quad (6'')$$

In a case where the present projection lens is a fixed focus optical system, the projection lens preferably satisfies a conditional expression (7) given below:

$$0.3 < Bf/|exP| < 1.0 \quad (7)$$

where,

Bf: air equivalent distance on the optical axis from the most reduction side lens surface to the reduction side focal position of the entire system; and exP: distance from the reduction side focal position of the entire system to the reduction side pupil position.

By configuring the projection lens so as not to fall to or below the lower limit of the conditional expression (7), interference between the projection lens and illumination light due to excessively reduced Bf or inefficient use of illumination light may be prevented. By configuring the projection lens so as not to reach or exceed the upper limit of the conditional expression (7), interference between the projection lens and illumination light due to increased lens system or high cost may be prevented.

In order to further enhance the effects with respect to the lower limit of the conditional expression (7), the projection lens preferably satisfies a conditional expression (7') given below, and more preferably satisfies a conditional expression (7") given blow in order to still further enhance the effects:

$$0.4 < Bf/|exP| < 1.0 \quad (7')$$

$$0.45 < Bf/|exP| < 1.0 \quad (7'').$$

Further, the projection lens preferably satisfies a conditional expression (8) given blow. By configuring the projection lens so as not to reach or exceed the upper limit of the conditional expression (8), the projection lens may satisfy the brightness required of projection lenses.

$$F\max < 4.0 \quad (8)$$

where,

Fmax: F-number of the entire system in a case where the projection lens is a fixed focus optical system, or maximum F-number in a case where the projection lens is a variable magnification optical system.

In order to further enhance the effects of the conditional expression (8), the projection lens preferably satisfies a conditional expression (8') given below:

$$F\max < 3.5 \quad (8').$$

Note that, in order to introduce illumination light into the projection lens by suppressing illumination light loss, the angle formed between the angle bisector line of the upper side marginal ray and the lower side marginal ray of each light beam focused at any point on the reduction side image plane and the principal ray of each light beam is preferably within ±3° in cross-section.

In order to satisfy appropriate specifications as the projection lens intended by the present invention, the distortion is preferably reduced to about ±2% or less, and in a case where the projection lens is a variable magnification system, the distortion is preferably reduced to about ±2% or less over the entire magnification range.

Note that the foregoing preferable configurations and possible configurations may be combined in any manner and are preferably employed selectively, as appropriate, according to the matters required of the projection lens.

Next, specific examples of the projection lens of the present invention will be described.

Example 1

Since the configuration diagram of the projection lens of Example 1 is as illustrated in FIG. 1, the explanation of the drawing is not repeated here. The projection lens of Example 1 is a fixed focus optical system, and is configured non-telecentric on the reduction side. The projection lens of Example 1 is composed essentially of 13 lenses, lenses L1 to L13, in order from the magnification side. The lens L3 is a compound aspherical lens, and is composed of a glass lens LG and a resin layer LP formed on the reduction side surface of the glass lens LG and having an aspherical shape on the reduction side lens surface.

Numerical data representing a detailed configuration of the projection lens of Example 1 are shown in Tables 1 to 3 below. Table 1 shows basic lens data, Table 2 shows aspherical surface coefficients, and Table 3 shows specs with respect to the d-line, values of variable surface distances, and the like. These tables show values rounded to a predetermined digit, millimeter is used as the unit of length and degree is used as the unit of angle.

The Si column in Table 1 indicates $i^{th}$ surface number in which a number i (i=1, 2, 3, - - - ) is given to each surface of each component in a serially increasing manner toward the reduction side with the magnification side surface of the most magnification side component being taken as the first surface. The Ri column indicates the radius of curvature of $i^{th}$ surface, and the Di column indicates the surface distance between $i^{th}$ surface and $(i+1)^{th}$ surface on the optical axis Z. The Ndj column indicates the refractive index of $j^{th}$ component with respect to the d-line (wavelength 587.6 nm) in which a number j (j=1, 2, 3, - - - ) is given to each component in a serially increasing manner toward the reduction side with the most magnification side component being taken as the first component, and the vdj column indicates the Abbe number of $j^{th}$ component with respect to the d-line.

Note that the sign of the radius of curvature is positive in a case where the surface shape is convex on the magnification side and negative in a case where it is convex on the reduction side. The basic lens data include the filter 2a. An asterisk mark * is attached to the surface number of an aspherical surface and a value of paraxial radius of curvature is given in the radius of curvature column corresponding to the aspherical surface.

Table 2 shows aspherical surface coefficients of each aspherical surface of Example 1. The "E-n" (n: integer) in the values of aspherical surface coefficients in Table 2 refers to "×10$^{-n}$". The aspherical surface coefficients are the values of coefficients KA and Am (m is an integer of three or greater and differs depending on the aspherical surface) in an aspherical surface expression given below:

$$Zd = \frac{C \times h^2}{1 + \sqrt{1 - KA \times C^2 \times h^2}} + \sum_m Am \times h^m.$$

where,

Zd: depth of aspheric surface (length of vertical line from a point on the aspheric surface at height h to a flat surface orthogonal to the optical axis to which the aspherical vertex contacts), h: height (distance from the optical axis to lens surface), C: paraxial curvature, and KA, Am: aspherical surface coefficients.

In Table 1, a symbol DD [ ] is used for a variable surface distance, and the surface number of the surface on the magnification side of the distance is given in [ ] and entered in the Di column. The projection lens of Example 1 may perform focusing by moving only the lens L7 in an optical axis direction, and DD [11] and DD [13] corresponding to the surface distances respectively on the magnification side and reduction side of the lens L7 are the variable surface distances that vary at the time of focusing.

Table 3 shows a focal length f of the entire system, an air equivalent distance Bf on the optical axis from the most reduction side lens surface to the reduction side focal position of the entire system, an F-number FNo., a total angle of view 2ω, and a value of each variable surface distance in each of cases where the projection distance is infinity and the magnification ratio is −143.57. Note that Bf corresponds to the back focus in a case where the reduction side is assumed to be the back side. Bf is given a value only in a case where the projection distance is infinity. Table 3 also gives a value of the distance exP from the reduction side focal position of the entire system and the reduction side pupil position. The sign of exP herein is negative in a case where the reduction side pupil position is on the magnification side of the reduction side focal position of the entire system and positive in a case where it is on the reduction side.

TABLE 1

Example 1

| Si | Ri | Di | Ndj | vdj |
|---|---|---|---|---|
| *1 | −7.667 | 5.00 | 1.49100 | 57.58 |
| *2 | −14.679 | 7.01 | | |
| 3 | 44.560 | 2.00 | 1.84666 | 23.78 |
| 4 | 16.283 | 6.61 | | |
| 5 | 48.801 | 1.60 | 1.77250 | 49.60 |
| 6 | 13.394 | 0.39 | 1.52516 | 53.74 |
| *7 | 16.289 | 7.14 | | |
| 8 | −73.236 | 6.08 | 1.62004 | 36.26 |
| 9 | −15.126 | 4.47 | 1.62299 | 58.16 |
| 10 | 13.599 | 8.59 | 1.69895 | 30.13 |
| 11 | −47.255 | DD[11] | | |
| 12 | 25.535 | 9.09 | 1.63980 | 34.46 |
| 13 | −5136.625 | DD[13] | | |
| 14 | −25.698 | 0.80 | 1.80518 | 25.42 |
| 15 | 57.659 | 0.20 | | |
| *16 | 15.345 | 3.71 | 1.58313 | 59.38 |
| *17 | −22.489 | 0.43 | | |
| 18 | 82.685 | 4.72 | 1.48749 | 70.23 |
| 19 | −6.705 | 0.90 | 1.78800 | 47.37 |
| 20 | −10.489 | 0.20 | | |
| 21 | −36.349 | 1.01 | 1.90366 | 31.32 |
| 22 | 14.756 | 5.33 | 1.48749 | 70.23 |
| 23 | −14.257 | 17.11 | | |
| 24 | ∞ | 1.05 | 1.51633 | 64.14 |
| 25 | ∞ | | | |

TABLE 2

Example 1

| Si | 1 | 2 | 7 |
|---|---|---|---|
| KA | −8.5719853E+00 | −2.6745798E+01 | 1.0000000E+00 |
| A3 | 1.5920330E−04 | 3.1483054E−03 | −2.9417969E−14 |
| A4 | 6.4277187E−05 | −1.8375107E−04 | −3.2281069E−04 |
| A5 | −2.6245798E−06 | 1.7446259E−06 | 2.9977372E−04 |
| A6 | −7.1646538E−08 | 8.1243040E−07 | −1.3091277E−04 |
| A7 | 5.1438943E−09 | −3.8682623E−08 | 5.2176877E−05 |
| A8 | 9.9715036E−11 | −1.4916860E−09 | −1.8614640E−05 |
| A9 | −1.1116671E−11 | 1.1301006E−10 | 5.1016092E−06 |
| A10 | 1.6215062E−13 | 3.7654535E−13 | −1.0105382E−06 |
| A11 | 3.4757273E−15 | −1.0885401E−13 | 1.4477177E−07 |
| A12 | −7.7401079E−17 | −7.5245830E−17 | −1.5192709E−08 |
| A13 | −7.9355920E−19 | 6.9978942E−17 | 1.1713670E−09 |
| A14 | 9.5118328E−21 | 9.5699680E−20 | −6.4910335E−11 |
| A15 | 4.6228745E−22 | −3.7192980E−20 | 2.4231280E−12 |
| A16 | −5.6928839E−24 | 3.8630982E−22 | −5.2884401E−14 |
| A17 | 0.0000000E+00 | 0.0000000E+00 | 4.7615141E−16 |

| Si | 16 | 17 |
|---|---|---|
| KA | 1.0000000E+00 | 1.0000000E+00 |
| A4 | 9.4046330E−05 | 2.7856592E−04 |
| A6 | 3.8512134E−06 | 2.1936506E−06 |
| A8 | −3.2621542E−08 | 3.7694430E−08 |
| A10 | 1.4761490E−09 | 6.9126049E−10 |

TABLE 3

Example 1

|  | Projection Distance Infinity | Magnification Ratio −143.57 |
|---|---|---|
| f | 5.37 | 5.31 |
| Bf | 17.80 | — |
| FNo. | 2.65 | 2.65 |
| 2ω | 132.8° | 133.4° |
| DD[11] | 0.30 | 0.76 |
| DD[13] | 3.02 | 2.56 |
| exP | −31.0 | |

Figure 10:
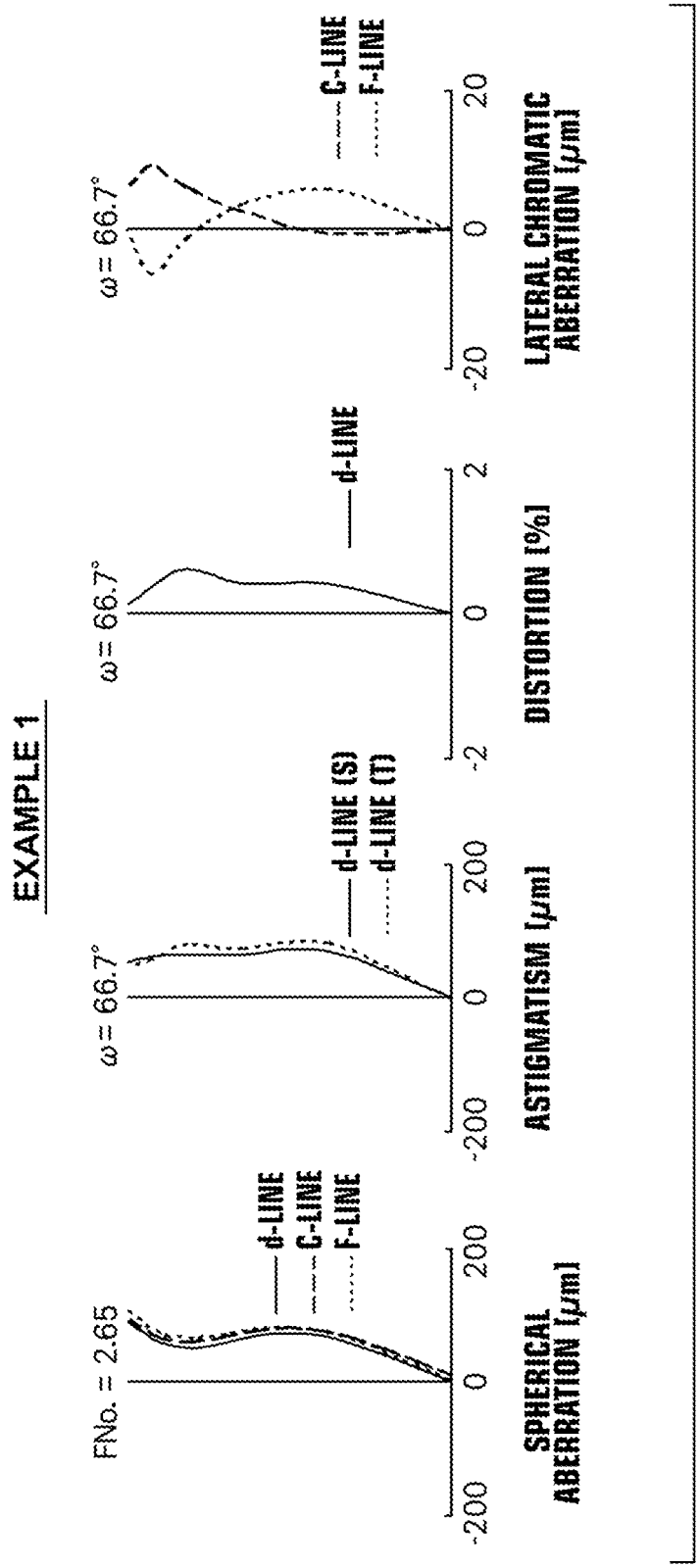
FIG. 10 shows various types of aberrations of the projection lens of Example 1 of the present invention, illustrating the diagrams of spherical aberration, astigmatism, distortion, and lateral chromatic aberration, in order from the left.

FIG. 10 shows each aberration diagram of spherical aberration, astigmatism, distortion, and lateral chromatic aberration of the projection lens of Example 1 in order from the left in a case where the magnification ratio is −143.57. In FIG. 10, the spherical aberration diagram illustrates aberrations with respect to the d-line (wavelength 587.6 nm), the C-line (wavelength 656.3 nm), and the F-line (wavelength 486.1 nm) by a solid line, a long dashed line, and a short dashed line respectively, the astigmatism diagram illustrates aberrations with respect to the d-line in the sagittal direction and the tangential direction by a solid line and a short dashed line respectively, the distortion diagram illustrates aberration with respect to the d-line by a solid line, and the lateral chromatic aberration diagram illustrates aberrations with respect to the C-line and the F-line by a long dashed line and a short dashed line respectively. The FNo. in the spherical aberration diagram represents the F-number and ω in other diagrams represents the half angle of view.

As the symbols and their meanings, and illustration method used in the description of Example 1 will apply to the following examples unless otherwise specifically described, overlapping descriptions will be omitted in the following descriptions of examples. Further, as the following points in the cross-sectional view of each example to be described below are identical to those in the cross-sectional view of Example 1, overlapping descriptions are also omitted in the following descriptions of examples: the left side corresponds to the magnification side and the right side corresponds to the reduction side in the drawing; and the drawing also illustrates an upper side axial marginal ray 4a, a lower side axial marginal ray 4b, an upper side outermost off-axis marginal ray 5a, a lower side outermost off-axis marginal ray 5b, an outermost off-axis principal ray 5c, and an image display surface 1.

Example 2

FIG. 4 shows a cross-sectional view of a projection lens of Example 2, illustrating a configuration thereof and light rays. The projection lens of Example 2 is a zoom lens of five group configuration in which a first lens group G1 to a fifth lens group G5 are disposed in order from the magnification side, and is configured telecentric on the reduction side. In FIG. 4, the upper side denoted as "WIDE" illustrates the projection lens in the wide angle end state while the lower side denoted as "TELE" illustrates the projection lens in the telephoto end state. The first lens group G1 is composed of lenses L1 to L4 in order from the magnification side, the second lens group G2 is composed of lenses L5 to L7 in order from the magnification side, the third lens group G3 is composed of only a lens L8, the fourth lens group G4 is composed of lenses L9 to L12 in order from the magnification side, and the fifth lens group G5 is composed of only a lens L13. The lens L9 is a compound aspherical lens, and is composed of a glass lens LG and a resin layer LP formed on the magnification side surface of the glass lens LG and having an aspherical shape on the magnification side lens surface. FIG. 4 shows an example in which a glass block 2b, assuming a prism, a filter, and the like, is disposed, instead of the filter 2a illustrated in FIG. 1.

Tables 4, 5, and 6 respectively show basic lens data, aspherical surface coefficients, and specs, values of variable surface distances, and the like of the projection lens of Example 2. Each value shown in Table 6 is a value in a case where the projection distance is infinity. Table 6 also shows a zoom ratio Zr, in addition to f, Bf, FNo., 2ω, and a value of each variable surface distance in each of the wide angle end state and the telephoto end state. In Tables 4 and 6, a variable surface distance that varies at the time of magnification change is shown using a symbol DD [ ]. As the projection lens is configured telecentric in the reduction side, the word "Telecentric" is entered in the exP column. Also in the following examples, the exP column appears in the same way for an example which is telecentric on the reduction side.

TABLE 4

Example 2

| Si | Ri | Di | Ndj | vdj |
|---|---|---|---|---|
| *1 | −45.010 | 4.80 | 1.49100 | 57.58 |
| *2 | −82.510 | 1.86 | | |
| 3 | 119.148 | 2.00 | 1.48749 | 70.23 |
| 4 | 27.331 | 7.00 | | |
| 5 | 132.920 | 3.50 | 1.80518 | 25.42 |
| 6 | ∞ | 6.16 | | |
| 7 | −33.923 | 1.60 | 1.49700 | 81.54 |
| 8 | 154.987 | DD[8] | | |
| 9 | 95.485 | 6.71 | 1.78590 | 44.20 |
| 10 | −93.954 | 0.83 | | |
| 11 | 53.980 | 8.19 | 1.83400 | 37.16 |
| 12 | −78.372 | 1.60 | 1.84666 | 23.78 |
| 13 | 106.528 | DD[13] | | |
| 14 | 54.212 | 4.19 | 1.51633 | 64.14 |
| 15 | −267.008 | DD[15] | | |
| *16 | −73.156 | 0.20 | 1.52516 | 53.74 |
| 17 | −93.736 | 1.20 | 1.64769 | 33.79 |
| 18 | 50.386 | 6.06 | | |
| 19 | −31.067 | 1.26 | 1.76182 | 26.52 |
| 20 | 44.831 | 7.23 | 1.61800 | 63.33 |
| 21 | −34.856 | 3.41 | | |
| 22 | 220.805 | 6.35 | 1.80100 | 34.97 |
| 23 | −44.758 | DD[23] | | |
| 24 | 82.809 | 5.45 | 1.61800 | 63.33 |
| 25 | −113.748 | 10.32 | | |
| 26 | ∞ | 32.00 | 1.51633 | 64.14 |
| 27 | ∞ | | | |

TABLE 5

Example 2

| Si | 1 | 2 | 16 |
|---|---|---|---|
| KA | −1.7005374E+00 | −1.9100779E+01 | 1.0000000E+00 |
| A3 | 1.4741017E−19 | −6.1281958E−19 | −2.0731513E−18 |
| A4 | 3.3430787E−05 | 2.8512713E−05 | 7.7053899E−05 |
| A5 | −3.4337147E−07 | −1.0495234E−06 | −1.0684122E−04 |
| A6 | −6.7188109E−08 | 4.0002032E−08 | 5.5079146E−05 |
| A7 | 1.2376254E−09 | −4.4932294E−09 | −1.4554614E−05 |
| A8 | 7.9579350E−11 | 1.2089807E−10 | 1.5630904E−06 |
| A9 | −4.5141233E−13 | 7.4038285E−12 | 1.3158190E−07 |
| A10 | −1.2115281E−13 | −2.8146742E−13 | −5.3781743E−08 |
| A11 | 2.7797258E−16 | −6.4886087E−15 | 4.0392333E−09 |
| A12 | 1.0756097E−16 | 1.9455449E−16 | 2.9972842E−10 |

TABLE 5-continued

Example 2

| Si | 1 | 2 | 16 |
|---|---|---|---|
| A13 | −1.8774987E−19 | 6.1647550E−18 | −6.2537111E−11 |
| A14 | −4.8028930E−20 | −1.7241914E−20 | 2.1387444E−12 |
| A15 | 5.5282812E−23 | −4.9135158E−21 | 1.9020560E−13 |
| A16 | 8.4608621E−24 | −1.3929270E−23 | −1.7171442E−14 |
| A17 | −5.6796018E−27 | 1.4686884E−24 | 3.9503356E−16 |

TABLE 6

Example 2

Projection Distance: Infinity

| | Wide Angle End | Telephoto End |
|---|---|---|
| Zr | 1.0 | 1.6 |
| f′ | 22.66 | 36.26 |
| Bf | 31.42 | 31.42 |
| FNo. | 1.58 | 1.79 |
| 2ω | 58.4° | 37.8° |
| DD[8] | 18.45 | 3.50 |
| DD[13] | 24.96 | 1.50 |
| DD[15] | 2.55 | 22.38 |
| DD[23] | 0.50 | 19.08 |
| exP | Telecentric | |

Figure 11:
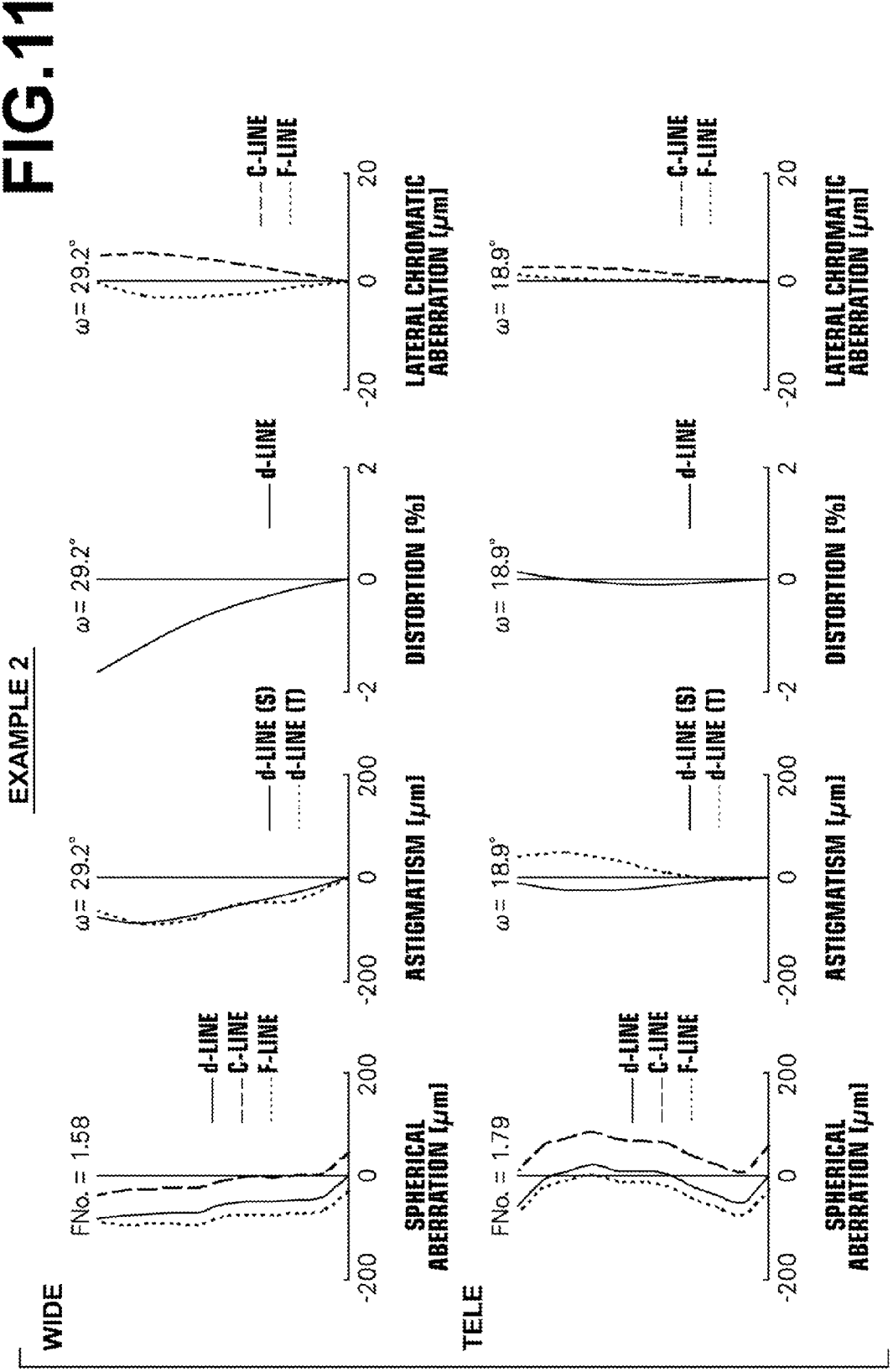
FIG. 11 shows various types of aberrations of the projection lens of Example 2 of the present invention, in which the upper side illustrates those in the wide angle end state and the lower side illustrates those in the telephoto end state, and each state illustrates the diagrams of spherical aberration, astigmatism, distortion, and lateral chromatic aberration, in order from the left.

FIG. 11 shows each aberration diagram of spherical aberration, astigmatism, distortion, and lateral chromatic aberration of the projection lens of Example 2 in order from the left in a case where the magnification ratio is −105.46. In FIG. 11, the upper side denoted as "WIDE" shows aberrations in the wide angle end state, while the lower side denoted as "TELE" shows aberrations in the telephoto end state.

Example 3

Figure 5:
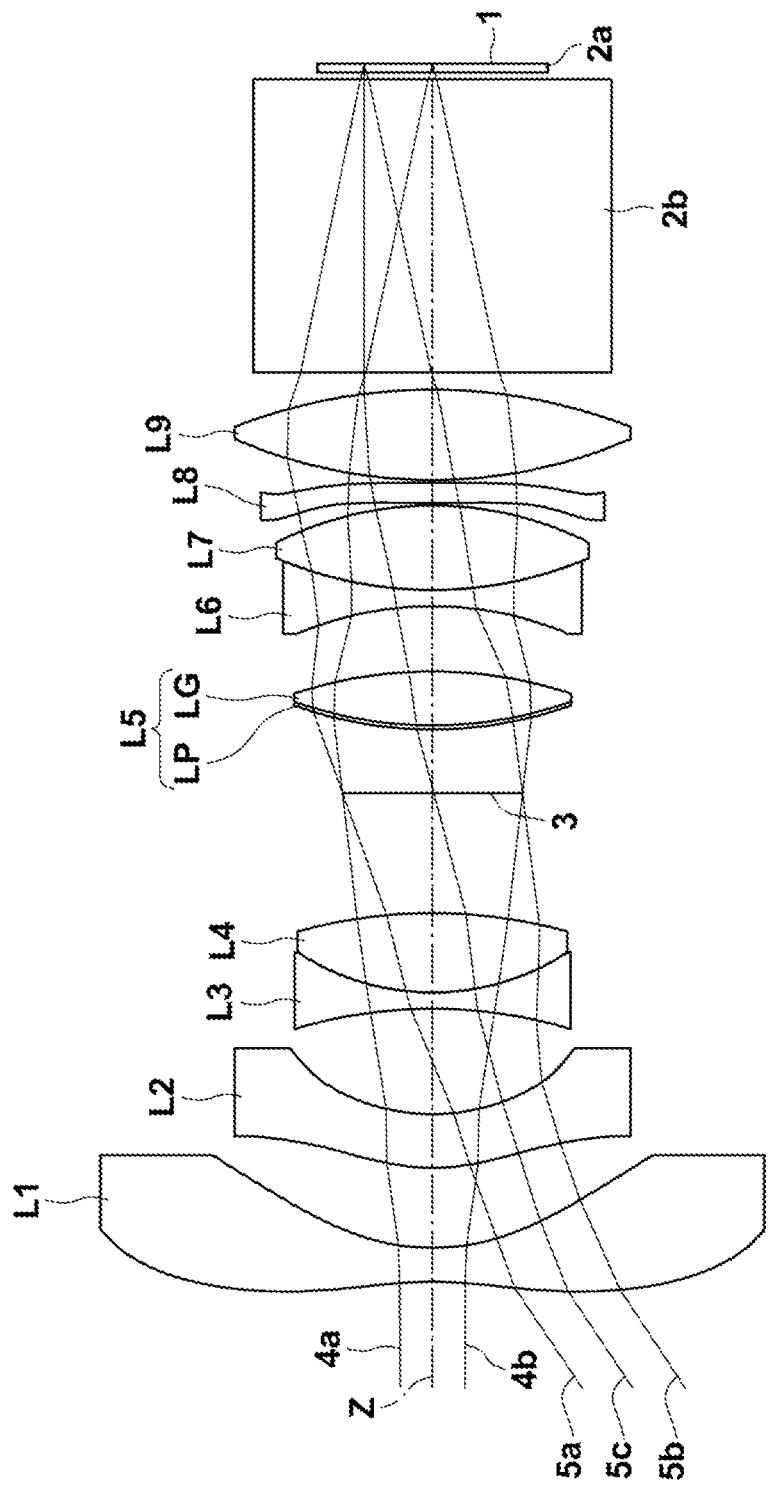
FIG. 5 is a cross-sectional view of a projection lens of Example 3 of the present invention, illustrating a configuration thereof and light rays.

FIG. 5 shows a cross-sectional view of a projection lens of Example 3, illustrating a configuration thereof and light rays. The projection lens of Example 3 is a fixed focus optical system, and is configured telecentric on the reduction side. The projection lens of Example 3 is composed essentially of 9 lenses, lenses L1 to L9, in order from the magnification side. The lens L5 is a compound aspherical lens, and is composed of a glass lens LG and a resin layer LP formed on the magnification side surface of the glass lens LG and having an aspherical shape on the magnification side lens surface. FIG. 5 shows an example in which an aperture 3 that defines a light beam diameter is disposed between the lens L4 and the lens L5, and a filter 2a and a glass block 2b are disposed on the reduction side of the most reduction side lens.

Figure 12:
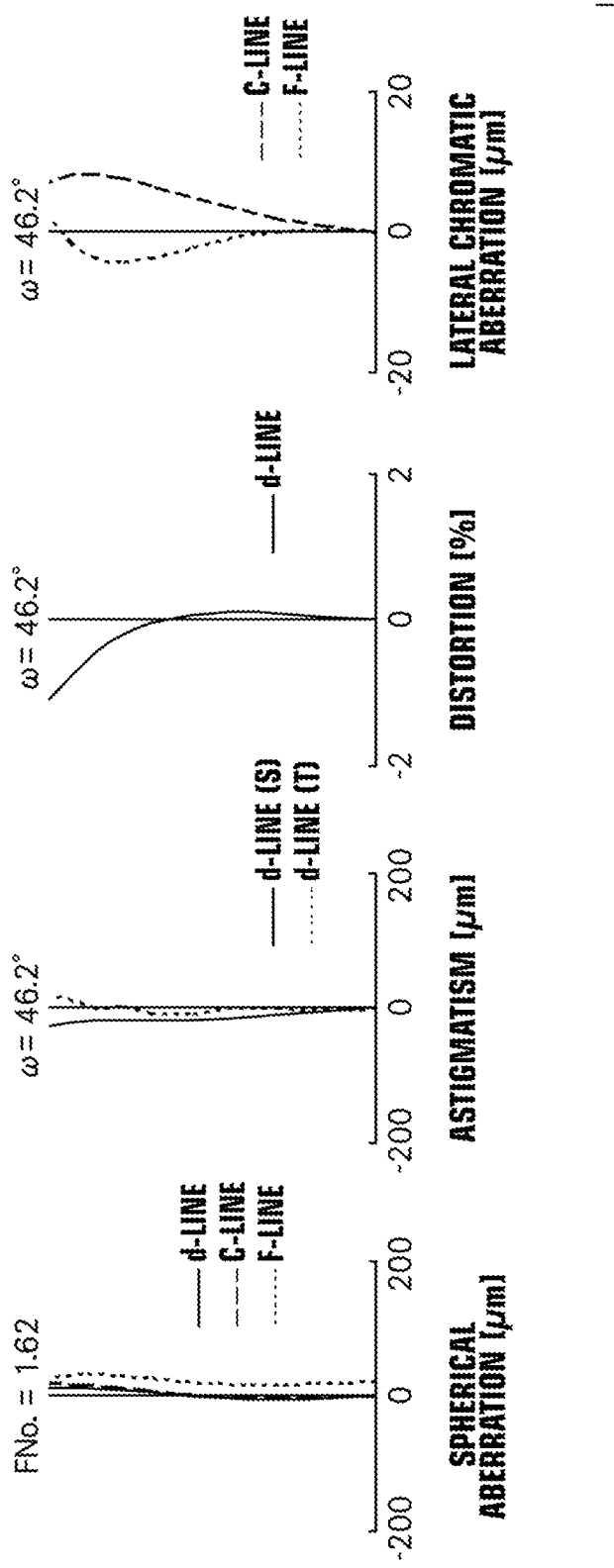
FIG. 12 shows various types of aberrations of the projection lens of Example 3 of the present invention, illustrating the diagrams of spherical aberration, astigmatism, distortion, and lateral chromatic aberration, in order from the left.

Tables 7, 8, and 9 respectively show basic lens data, aspherical surface coefficients, and specs, values of variable surface distances, and the like of the projection lens of Example 3. In Table 7, the surface number column of the surface corresponding to the aperture 3 includes the surface number and the word (AP). Table 9 shows each value in a case where the magnification ratio is −67.78. FIG. 12 shows each aberration diagram of spherical aberration, astigmatism, distortion, and lateral chromatic aberration of the projection lens of Example 3 in order from the left in a case where the magnification ratio is −67.78.

TABLE 7

Example 3

| Si | Ri | Di | Ndj | vdj |
|---|---|---|---|---|
| *1 | −21.802 | 2.50 | 1.49100 | 57.58 |
| *2 | 14.757 | 5.92 | | |
| *3 | 12.634 | 4.00 | 1.49100 | 57.58 |
| *4 | 12.768 | 7.82 | | |
| 5 | −30.958 | 1.21 | 1.59522 | 67.74 |
| 6 | 16.089 | 5.88 | 1.64769 | 33.79 |
| 7 | −32.535 | 8.93 | | |
| 8(AP) | ∞ | 4.70 | | |
| *9 | 26.830 | 0.30 | 1.52516 | 53.74 |
| 10 | 26.830 | 4.00 | 1.63854 | 55.38 |
| 11 | −28.814 | 4.84 | | |
| 12 | −22.498 | 1.21 | 1.84666 | 23.78 |
| 13 | 25.835 | 6.26 | 1.49700 | 81.54 |
| 14 | −22.669 | 0.20 | | |
| *15 | 174.316 | 1.50 | 1.49100 | 57.58 |
| *16 | −509.004 | 0.20 | | |
| 17 | 32.396 | 6.69 | 1.77250 | 49.60 |
| 18 | −35.509 | 1.29 | | |
| 19 | ∞ | 21.75 | 1.58913 | 61.27 |
| 20 | ∞ | 0.50 | | |
| 21 | ∞ | 0.65 | 1.51680 | 64.17 |
| 22 | ∞ | | | |

TABLE 8

Example 3

| Si | 1 | 2 | 3 | 4 |
|---|---|---|---|---|
| KA | −1.5815418E+01 | −5.1394600E+00 | −2.6217155E+00 | 7.9754843E−01 |
| A3 | 6.9536270E−04 | 1.1194326E−03 | 3.3732690E−04 | 2.9222243E−06 |
| A4 | 1.9471256E−05 | 4.6420472E−06 | −1.7633669E−04 | −3.4115467E−05 |
| A5 | −5.4475858E−07 | 3.2975684E−06 | 2.1332251E−06 | −1.7126758E−05 |
| A6 | −1.9823939E−07 | −5.0334537E−07 | 5.2479424E−08 | 3.0380011E−06 |
| A7 | 1.1204157E−08 | 4.1481993E−09 | 9.1525326E−09 | −7.7848715E−08 |
| A8 | −9.4460531E−11 | 4.3082606E−10 | 8.8569612E−10 | −5.5092195E−09 |
| A9 | 7.1160829E−12 | −3.6663140E−11 | 5.3772716E−11 | 1.0785200E−09 |
| A10 | −7.7052129E−13 | −4.2659324E−12 | 1.5512792E−12 | 3.4021292E−11 |
| A11 | 1.2018049E−14 | 1.0534834E−13 | −5.4204585E−14 | −6.9649536E−12 |
| A12 | 7.8745166E−18 | 3.1842934E−14 | −1.8313326E−14 | −7.8496451E−13 |
| A13 | 8.4590865E−18 | 1.9623408E−15 | −1.9633918E−15 | 2.5852780E−14 |
| A14 | 5.8870188E−19 | −1.8655781E−16 | −1.1049191E−16 | 1.6250796E−14 |
| A15 | −4.2815230E−20 | −2.2941823E−18 | 1.6458861E−20 | 1.4385933E−15 |
| A16 | 7.1469300E−22 | 1.9061016E−19 | 8.3479011E−19 | −2.3089514E−16 |

TABLE 8-continued

| | Example 3 | | |
|---|---|---|---|
| Si | 9 | 15 | 16 |
| KA | 9.3019369E−01 | 1.2460971E+02 | 5.4359765E+01 |
| A3 | 0.0000000E+00 | −2.1129037E−05 | −8.9083993E−06 |
| A4 | 6.1853859E−06 | −9.1945822E−05 | −4.2068323E−05 |
| A5 | 0.0000000E+00 | −5.0397306E−06 | −3.4390451E−06 |
| A6 | −7.2359217E−08 | −8.8960783E−08 | −2.8346267E−07 |
| A7 | 0.0000000E+00 | −2.7907107E−08 | −1.2624164E−08 |
| A8 | 9.7632585E−10 | −1.8997667E−09 | 2.1551584E−09 |
| A9 | 0.0000000E+00 | 3.3931814E−10 | 3.5155557E−10 |
| A10 | −7.1492691E−12 | 6.7210284E−11 | −7.6997499E−12 |
| A11 | 0.0000000E+00 | 3.9168848E−13 | −1.7876227E−12 |
| A12 | 0.0000000E+00 | −6.9446018E−13 | 9.8517908E−14 |
| A13 | 0.0000000E+00 | −6.2834393E−14 | 6.0395709E−15 |
| A14 | 0.0000000E+00 | 6.0036023E−15 | 1.7346889E−15 |
| A15 | 0.0000000E+00 | 1.1721051E−15 | −1.0150697E−16 |
| A16 | 0.0000000E+00 | −8.4213391E−17 | −3.2964956E−18 |

TABLE 9

| Example 3 | |
|---|---|
| | Magnification Ratio −67.78 |
| f | 7.57 |
| Bf | 15.79 |
| FNo. | 1.62 |
| 2ω | 92.4° |
| exP | Telecentric |

Example 4

Figure 6:
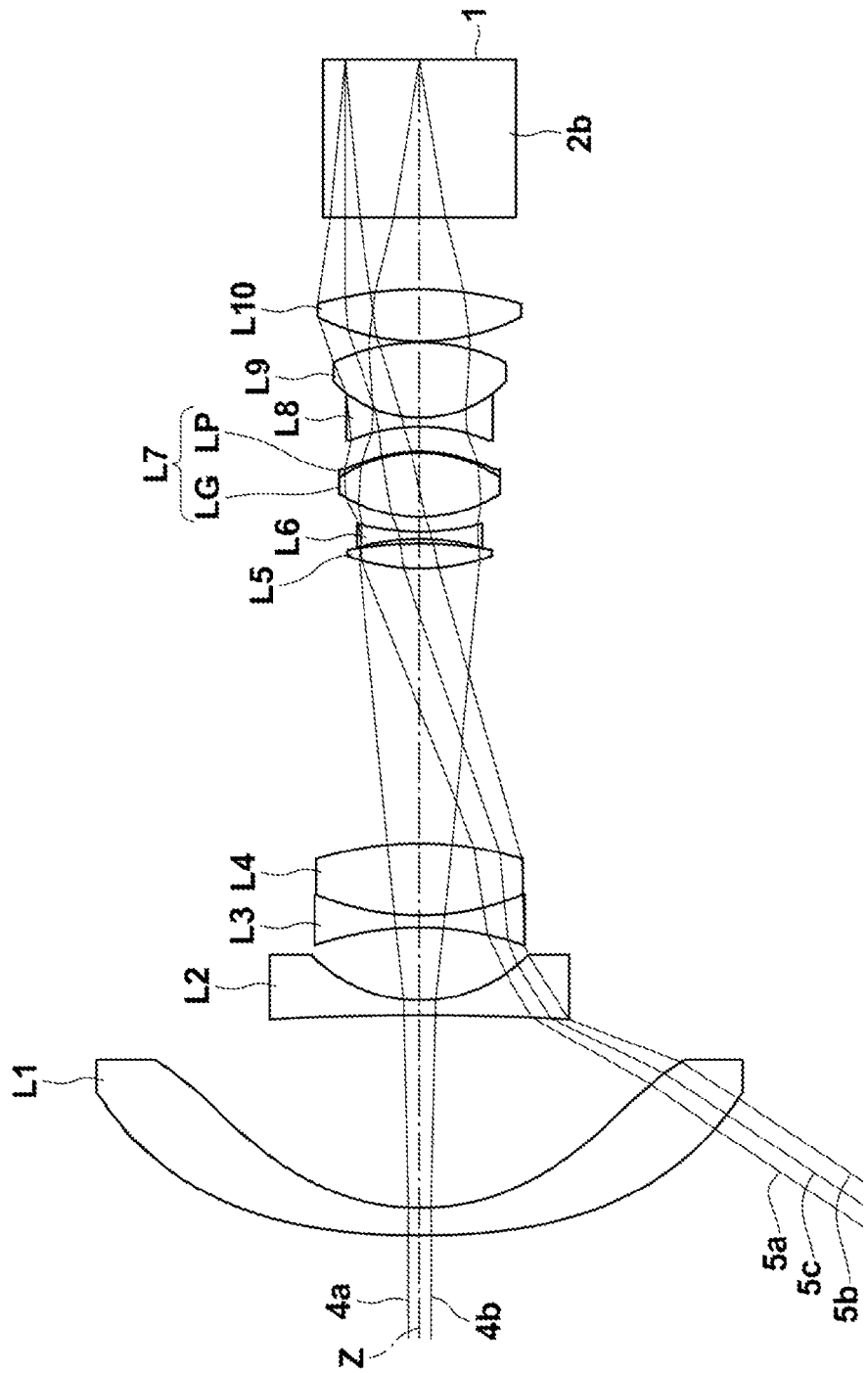
FIG. 6 is a cross-sectional view of a projection lens of Example 4 of the present invention, illustrating a configuration thereof and light rays.

FIG. 6 shows a cross-sectional view of a projection lens of Example 4, illustrating a configuration thereof and light rays. The projection lens of Example 4 is a fixed focus optical system, and is configured telecentric on the reduction side. The projection lens of Example 4 is composed essentially of 10 lenses, lenses L1 to L10, in order from the magnification side. The lens L7 is a compound aspherical lens, and is composed of a glass lens LG and a resin layer LP formed on the reduction side surface of the glass lens LG and having an aspherical shape on the reduction side lens surface. FIG. 6 shows an example in which a glass block 2b is disposed on the reduction side of the most reduction side lens.

Figure 13:
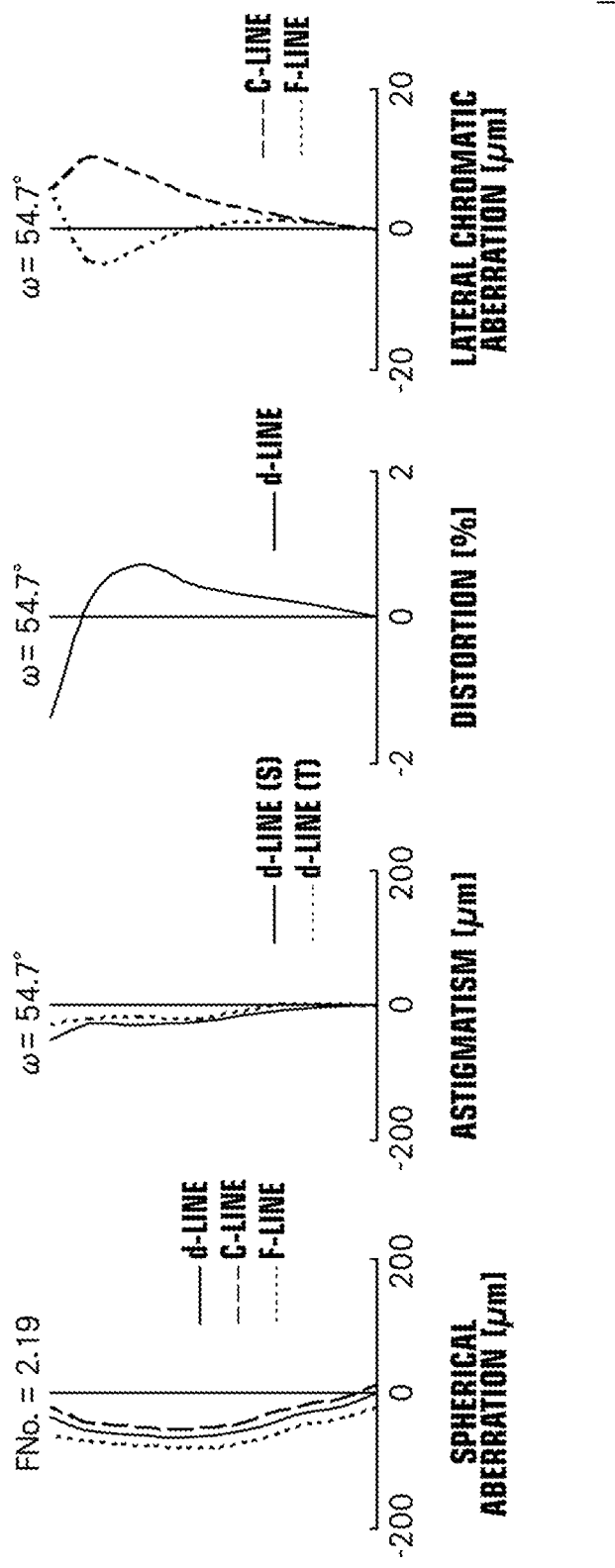
FIG. 13 shows various types of aberrations of the projection lens of Example 4 of the present invention, illustrating the diagrams of spherical aberration, astigmatism, distortion, and lateral chromatic aberration, in order from the left.

Tables 10, 11, and 12 respectively show basic lens data, aspherical surface coefficients, and specs, values of variable surface distances, and the like of the projection lens of Example 4. Table 12 shows each value in a case where the magnification ratio is −127.28. FIG. 13 shows each aberration diagram of spherical aberration, astigmatism, distortion, and lateral chromatic aberration of the projection lens of Example 4 in order from the left in a case where the magnification ratio is −127.28.

TABLE 10

| | Example 4 | | | |
|---|---|---|---|---|
| Si | Ri | Di | Ndj | vdj |
| *1 | 1446.268 | 4.50 | 1.49100 | 57.58 |
| *2 | 46.489 | 32.10 | | |
| 3 | −402.695 | 2.50 | 1.68893 | 31.07 |
| 4 | 22.616 | 12.13 | | |
| 5 | −46.728 | 2.01 | 1.63854 | 55.38 |

TABLE 10-continued

| | Example 4 | | | |
|---|---|---|---|---|
| Si | Ri | Di | Ndj | vdj |
| 6 | 38.673 | 12.00 | 1.62004 | 36.26 |
| 7 | −50.526 | 45.80 | | |
| 8 | 30.715 | 4.19 | 1.84666 | 23.78 |
| 9 | −59.607 | 0.75 | | |
| 10 | −34.061 | 1.20 | 1.83481 | 42.73 |
| 11 | 35.258 | 2.47 | | |
| 12 | 22.215 | 10.70 | 1.51742 | 52.43 |
| 13 | −20.645 | 0.25 | 1.52516 | 53.74 |
| *14 | −20.645 | 4.07 | | |
| 15 | −26.387 | 1.51 | 1.84666 | 23.78 |
| 16 | 17.957 | 12.56 | 1.49700 | 81.54 |
| 17 | −28.714 | 0.20 | | |
| 18 | 33.412 | 8.61 | 1.48749 | 70.23 |
| 19 | −54.179 | 12.05 | | |
| 20 | ∞ | 26.30 | 1.51680 | 64.20 |
| 21 | ∞ | | | |

TABLE 11

| | Example 4 | | |
|---|---|---|---|
| Si | 1 | 2 | 14 |
| KA | −7.8447113E+05 | 5.4714471E−01 | 6.2254610E−01 |
| A3 | 5.0285803E−04 | 5.7909912E−04 | −1.8262067E−05 |
| A4 | −1.4433391E−05 | −3.1321963E−05 | 3.0902955E−05 |
| A5 | −2.6410952E−07 | 1.4510267E−06 | −6.1428217E−07 |
| A6 | 3.1997209E−08 | −6.2920446E−08 | −1.6935439E−06 |
| A7 | −1.3128049E−09 | 1.0277511E−09 | 8.4898847E−07 |
| A8 | 5.5924347E−11 | −1.5155550E−12 | −1.9666026E−07 |
| A9 | −2.1997314E−12 | 2.4293178E−12 | 2.6484703E−08 |
| A10 | 6.1740194E−14 | −1.0773698E−13 | −2.2684104E−09 |
| A11 | −1.1860878E−15 | 1.4209462E−16 | 1.4282048E−10 |
| A12 | 1.4932789E−17 | 3.8261978E−17 | −8.6986473E−12 |
| A13 | −9.2178840E−20 | 2.0718695E−19 | 5.0846322E−13 |
| A14 | −3.6554820E−22 | −2.0437031E−20 | −1.7859718E−14 |
| A15 | 1.0262388E−23 | 1.9521064E−22 | 1.1108696E−16 |
| A16 | −5.0941991E−26 | −2.4341327E−25 | 6.8961665E−18 |

TABLE 12

Example 4

| | Magnification Ratio −127.28 |
|---|---|
| f | 8.15 |
| Bf | 29.33 |
| FNo. | 2.19 |
| 2ω | 109.4° |
| exP | Telecentric |

Example 5

Figure 7:
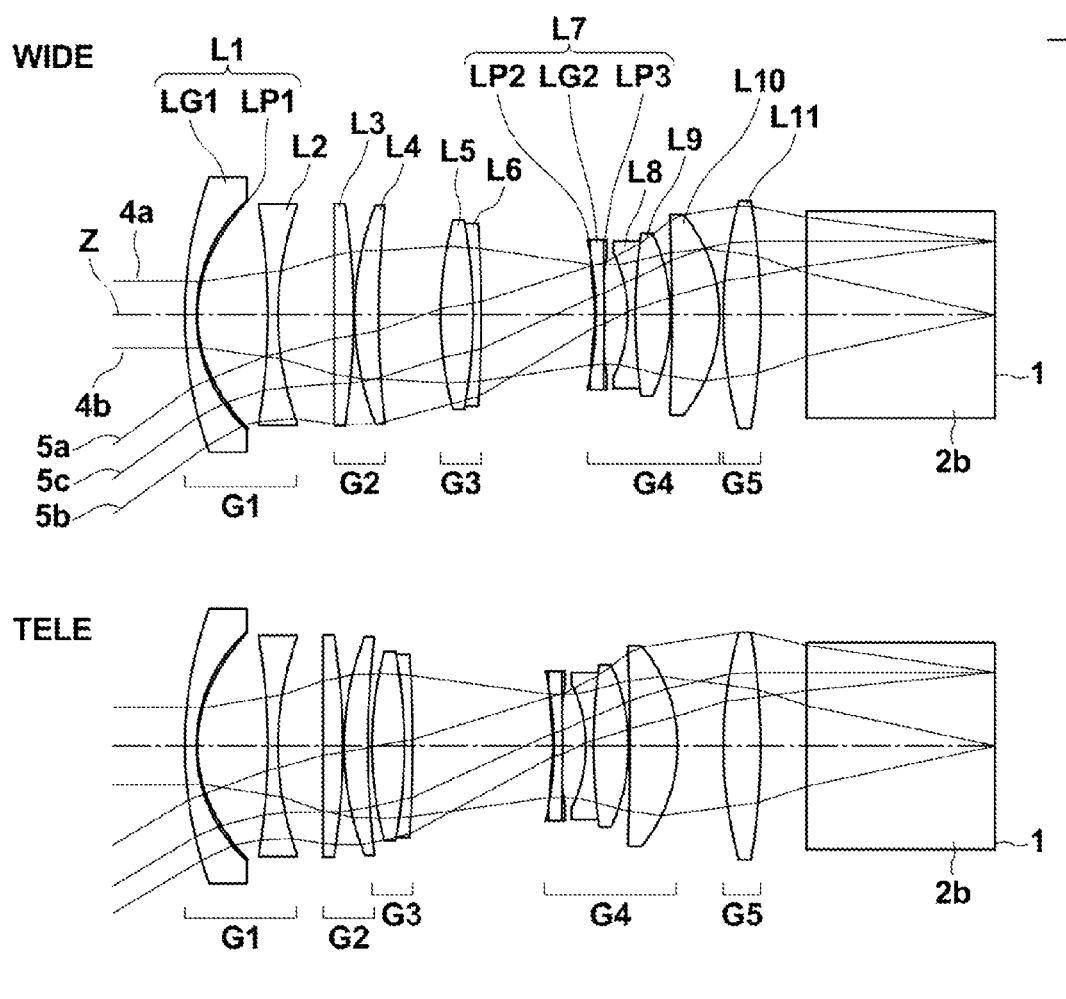
FIG. 7 is a cross-sectional view of a projection lens of Example 5 of the present invention, illustrating a configuration thereof and light rays, in which the upper side illustrates the projection lens in the wide angle end state and the lower side illustrates the projection lens in the telephoto end state.

FIG. 7 shows a cross-sectional view of a projection lens of Example 5, illustrating a configuration thereof and light rays. The projection lens of Example 5 is a zoom lens of five group configuration in which a first lens group G1 to a fifth lens group G5 are disposed in order from the magnification side, and is configured telecentric on the reduction side. In FIG. 7, the upper side denoted as "WIDE" illustrates the projection lens in the wide angle end state while the lower side denoted as "TELE" illustrates the projection lens in the telephoto end state. The first lens group G1 is composed of lenses L1 and L2 in order from the magnification side, the second lens group G2 is composed of lenses L3 and L4 in order from the magnification side, the third lens group G3 is composed of lenses L5 and L6, the fourth lens group G4 is composed of lenses L7 to L10 in order from the magnification side, and the fifth lens group G5 is composed of only a lens L11. The lenses L1 and L7 are compound aspherical lenses. The lens L1 is composed of a glass lens LG1 and a resin layer LP1 formed on the reduction side surface of the glass lens LG1 and having an aspherical shape on the reduction side lens surface. The lens L7 is composed of a glass lens LG2, a resin layer LP2 formed on the magnification side surface of the glass lens LG2 and having an aspherical shape on the magnification side lens surface, and a resin layer LP3 formed on the reduction side surface of the glass lens LG2 and having an aspherical shape on the reduction side lens surface. FIG. 7 shows an example in which a glass block 2b is disposed on the reduction side of the most reduction side lens.

Figure 14:
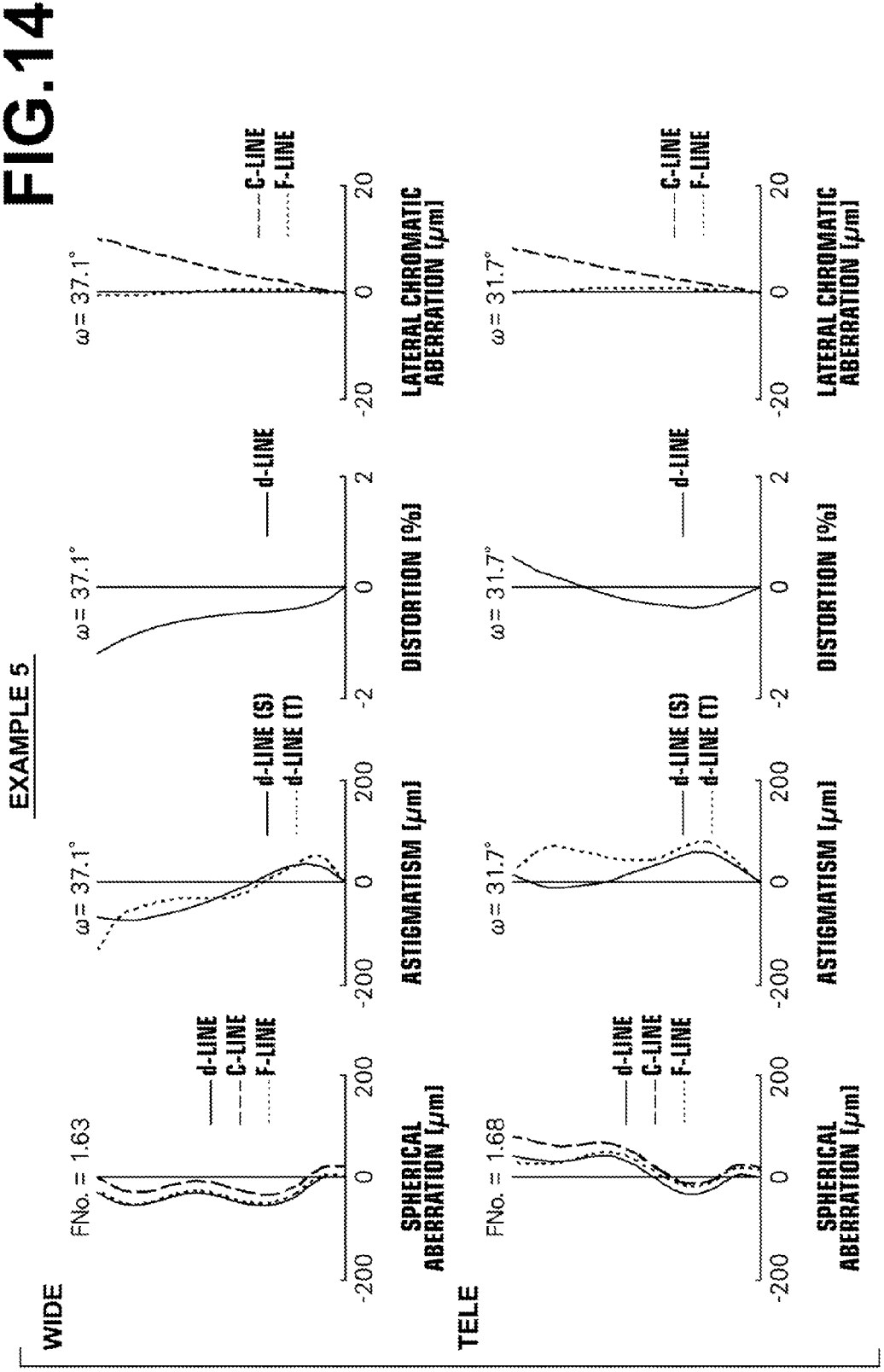
FIG. 14 shows various types of aberrations of the projection lens of Example 5 of the present invention, in which the upper side illustrates those in the wide angle end state and the lower side illustrates those in the telephoto end state, and each state illustrates the diagrams of spherical aberration, astigmatism, distortion, and lateral chromatic aberration, in order from the left.

Tables 13, 14, and 15 respectively show basic lens data, aspherical surface coefficients, and specs, values of variable surface distances, and the like of the projection lens of Example 5. Table 15 shows each value of the projection lens of Example 5 in the same manner as in Table 6. FIG. 14 shows each aberration diagram of spherical aberration, astigmatism, distortion, and lateral chromatic aberration of the projection lens of Example 5 in order from the left in a case where the magnification ratio is −81.40. In FIG. 14, the upper side denoted as "WIDE" shows aberrations in the wide angle end state, while the lower side denoted as "TELE" shows aberrations in the telephoto end state.

TABLE 13

Example 5

| Si | Ri | Di | Ndj | vdj |
|---|---|---|---|---|
| 1 | 55.413 | 1.80 | 1.80610 | 33.27 |
| 2 | 21.784 | 0.15 | 1.52516 | 53.74 |
| *3 | 18.718 | 11.06 | | |
| 4 | −88.203 | 1.60 | 1.60311 | 60.64 |
| 5 | 43.800 | DD[5] | | |
| 6 | ∞ | 3.07 | 1.84666 | 23.78 |

TABLE 13-continued

Example 5

| Si | Ri | Di | Ndj | vdj |
|---|---|---|---|---|
| 7 | −96.465 | 0.20 | | |
| 8 | 41.548 | 3.74 | 1.80610 | 33.27 |
| 9 | 127.336 | DD[9] | | |
| 10 | 51.027 | 5.07 | 1.77250 | 49.60 |
| 11 | −70.690 | 1.30 | 1.84666 | 23.78 |
| 12 | −181.559 | DD[12] | | |
| *13 | −22.826 | 0.15 | 1.52516 | 53.74 |
| 14 | −46.906 | 1.30 | 1.80610 | 40.92 |
| 15 | −664.439 | 0.15 | 1.52516 | 53.74 |
| *16 | −36.246 | 3.56 | | |
| 17 | −19.764 | 1.21 | 1.84666 | 23.78 |
| 18 | 78.685 | 5.49 | 1.60311 | 60.64 |
| 19 | −26.985 | 0.20 | | |
| 20 | −367.260 | 7.49 | 1.65160 | 58.40 |
| 21 | −21.945 | DD[21] | | |
| 22 | 58.375 | 5.83 | 1.71300 | 53.87 |
| 23 | −94.478 | 7.27 | | |
| 24 | ∞ | 29.50 | 1.51680 | 64.20 |
| 25 | ∞ | | | |

TABLE 14

Example 5

| Si | 3 | 13 | 16 |
|---|---|---|---|
| KA | 1.0000000E+00 | 1.0000000E+00 | 1.0000000E+00 |
| A3 | 9.0583288E−05 | −3.8705328E−05 | 0.0000000E+00 |
| A4 | −3.2716684E−05 | 4.7945588E−04 | 4.0777852E−04 |
| A5 | 1.7340238E−06 | −3.8715081E−05 | 0.0000000E+00 |
| A6 | −8.0703546E−08 | 9.3115615E−07 | −3.4260564E−06 |
| A7 | −3.0887652E−09 | −4.8126090E−08 | −1.5895966E−08 |
| A8 | 1.0029532E−10 | −2.2491391E−09 | 2.0644610E−08 |
| A9 | 1.0072482E−11 | 6.6052914E−10 | 1.7042110E−09 |
| A10 | 9.6880510E−14 | 1.5177567E−10 | −7.1278803E−11 |
| A11 | −3.7426272E−14 | −1.2144006E−11 | −2.8310347E−11 |
| A12 | −2.9797555E−15 | −4.4749094E−12 | −2.5920116E−12 |
| A13 | −5.0246055E−17 | −1.7169429E−13 | 3.7558979E−14 |
| A14 | 1.117633SE−17 | 4.7822576E−14 | 4.0545159E−14 |
| A15 | 1.0475863E−18 | 8.4544298E−15 | 4.4734278E−15 |
| A16 | −6.3767298E−20 | −7.8569295E−16 | −5.1423539E−16 |

TABLE 15

Example 5

| | Projection Distance: Infinity | |
|---|---|---|
| | Wide Angle End | Telephoto End |
| Zr | 1.0 | 1.2 |
| f | 16.03 | 19.24 |
| Bf | 26.72 | 26.72 |
| FNo. | 1.63 | 1.68 |
| 2ω | 74.2° | 63.4° |
| DD[5] | 8.78 | 7.09 |
| DD[9] | 9.72 | 0.64 |
| DD[12] | 17.82 | 22.02 |
| DD[21] | 0.62 | 7.18 |
| exP | Telecentric | |

Example 6

Figure 8:
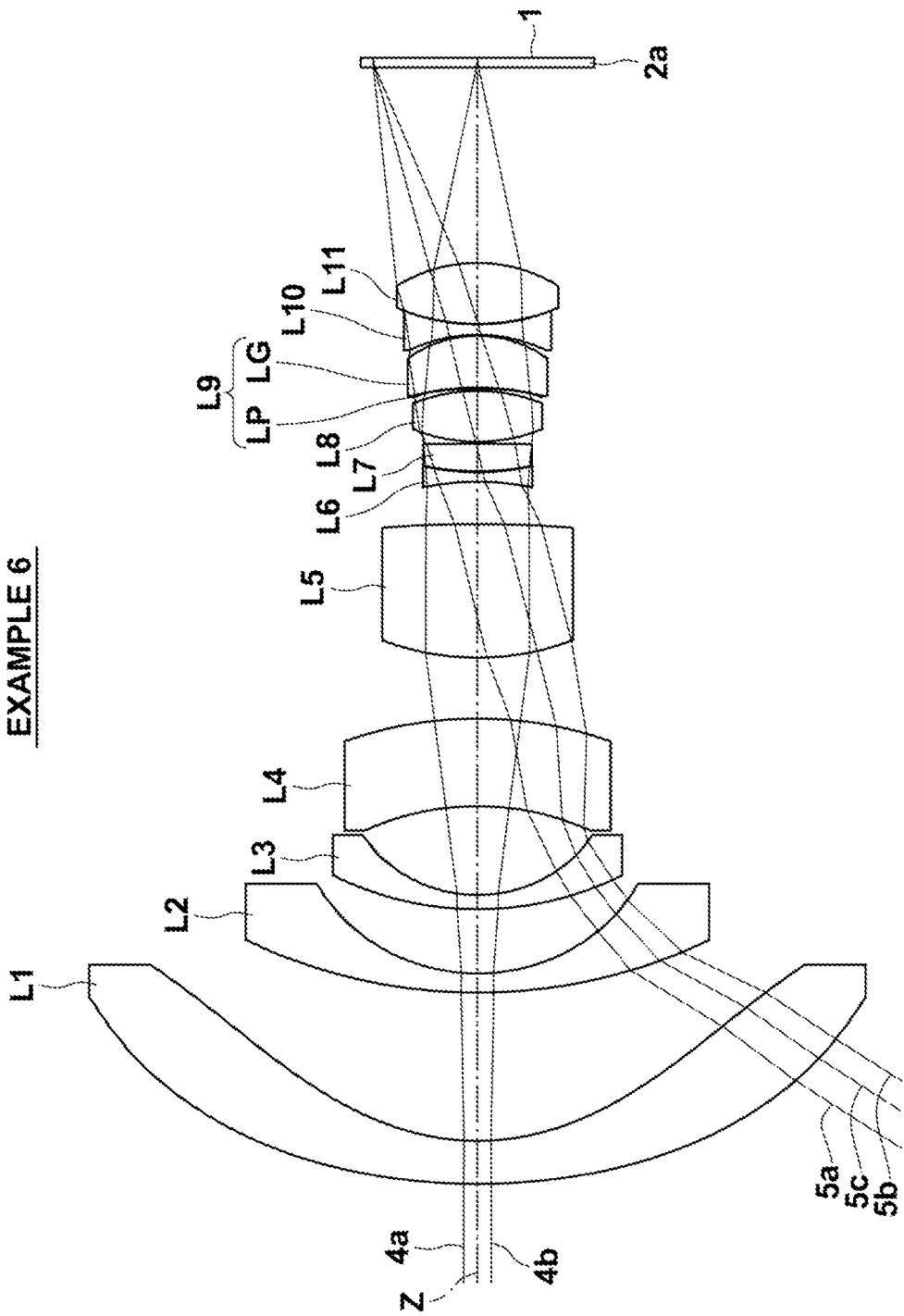
FIG. 8 is a cross-sectional view of a projection lens of Example 6 of the present invention, illustrating a configuration thereof and light rays.

FIG. 8 shows a cross-sectional view of a projection lens of Example 6, illustrating a configuration thereof and light rays. The projection lens of Example 6 is a fixed focus optical system, and is configured non-telecentric on the reduction side. The projection lens of Example 6 is composed essentially of 11 lenses, lenses L1 to L11, in order from the magnification side. The lens L9 is a compound aspherical lens, and is composed of a glass lens LG and a resin layer LP formed on the magnification side surface of the glass lens LG and having an aspherical shape on the magnification side lens surface. FIG. 8 shows an example in which a filter 2a is disposed on the reduction side of the most reduction side lens.

Figure 15:
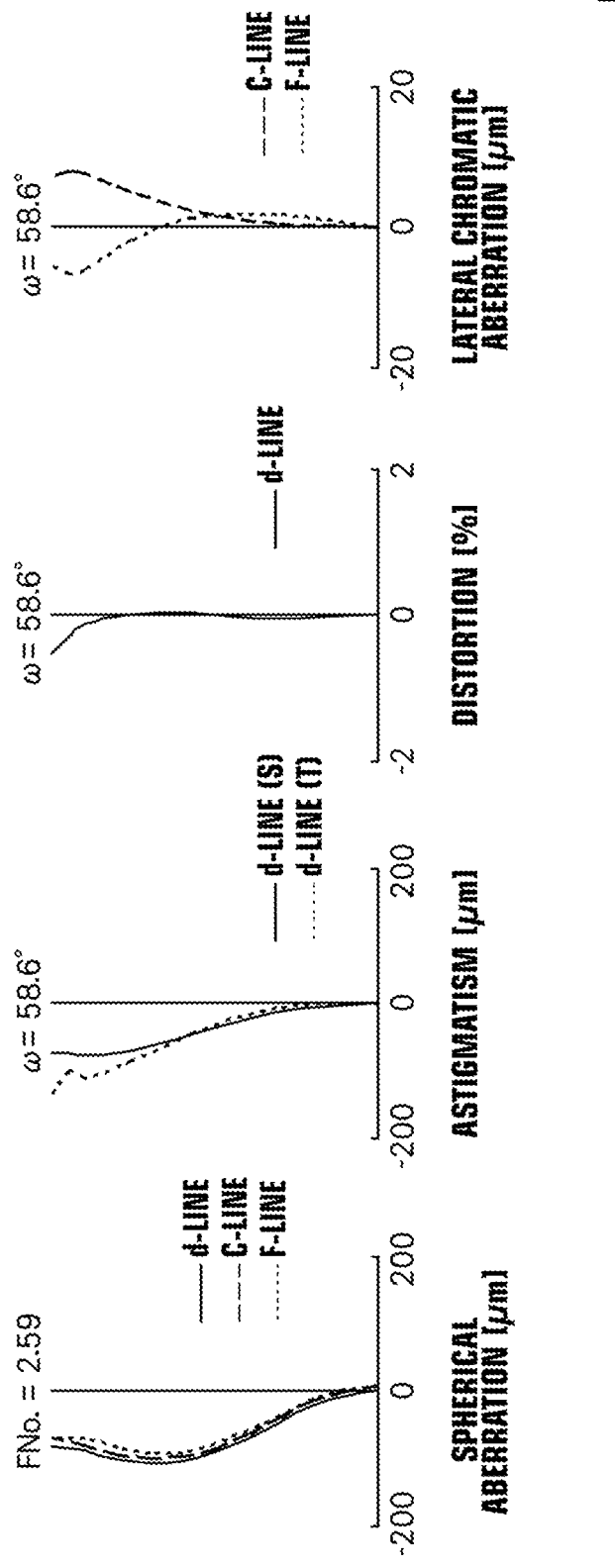
FIG. 15 shows various types of aberrations of the projection lens of Example 6 of the present invention, illustrating the diagrams of spherical aberration, astigmatism, distortion, and lateral chromatic aberration, in order from the left.

Tables 16, 17, and 18 respectively show basic lens data, aspherical surface coefficients, and specs, values of variable surface distances, and the like of the projection lens of Example 6. The projection lens of Example 6 may perform focusing by integrally moving the lenses L3 to L5 in an optical axis direction, and DD [4] and DD [10] in Table 16 corresponding to the surface distance on the magnification side of the lens L3 and the surface distance on the reduction side of the lens L5 respectively are variable surface distances. Table 18 shows each value in the same manner as in Table 3 in each of the cases in which the projection distance is infinity and the magnification ratio is −148.39. FIG. 15 shows each aberration diagrams of spherical aberration, astigmatism, distortion, and lateral chromatic aberration of the projection lens of Example 6 in order from the left in a case where the magnification ratio is −148.39.

TABLE 16

Example 6

| Si | Ri | Di | Ndj | vdj |
|---|---|---|---|---|
| *1 | 59.123 | 4.50 | 1.49100 | 57.58 |
| *2 | 22.515 | 15.54 | | |
| 3 | 49.373 | 2.00 | 1.80610 | 33.27 |
| 4 | 17.850 | DD[4] | | |
| 5 | 29.946 | 1.50 | 1.62041 | 60.29 |
| 6 | 13.203 | 9.30 | | |
| 7 | −25.109 | 9.18 | 1.62299 | 58.16 |
| 8 | −36.784 | 6.39 | | |
| 9 | 24.775 | 14.00 | 1.60342 | 38.03 |
| 10 | −109.302 | DD[10] | | |
| 11 | −24.540 | 1.00 | 1.77250 | 49.60 |
| 12 | 21.795 | 0.10 | | |
| 13 | 24.649 | 2.89 | 1.80518 | 25.42 |
| 14 | −314.764 | 0.20 | | |
| 15 | 15.549 | 5.33 | 1.51742 | 52.43 |
| 16 | −15.869 | 0.20 | | |
| *17 | −49.157 | 0.15 | 1.52516 | 53.74 |
| 18 | −23.735 | 5.43 | 1.48749 | 70.23 |
| 19 | −10.934 | 0.10 | | |
| 20 | −14.543 | 1.10 | 1.80518 | 25.42 |
| 21 | 18.829 | 0.05 | | |
| 22 | 19.338 | 6.39 | 1.49700 | 81.54 |
| 23 | −14.063 | 20.50 | | |
| 24 | ∞ | 1.00 | 1.51633 | 64.14 |
| 25 | ∞ | | | |

TABLE 17

Example 6

| Si | 1 | 2 | 17 |
|---|---|---|---|
| KA | −2.5195180E−06 | −2.1975635E−02 | 1.0000000E+00 |
| A4 | 2.5537911E−06 | 1.4834284E−06 | −2.2275833E−04 |
| A6 | −4.6860258E−10 | −6.6311190E−09 | −2.0310382E−06 |
| A8 | 7.0413758E−13 | −2.7296072E−14 | 1.3899758E−08 |
| A10 | 5.6095874E−17 | 1.3983022E−15 | −2.3999492E−10 |

TABLE 18

Example 6

| | Projection Distance Infinity | Magnification Ratio −148.39 |
|---|---|---|
| f | 7.01 | 6.91 |
| Bf | 21.17 | — |
| FNo. | 2.59 | 2.59 |
| 2ω | 117° | 117.2° |
| DD[4] | 6.74 | 7.28 |
| DD[10] | 4.43 | 3.89 |
| exP | | −40 |

Example 7

Figure 9:
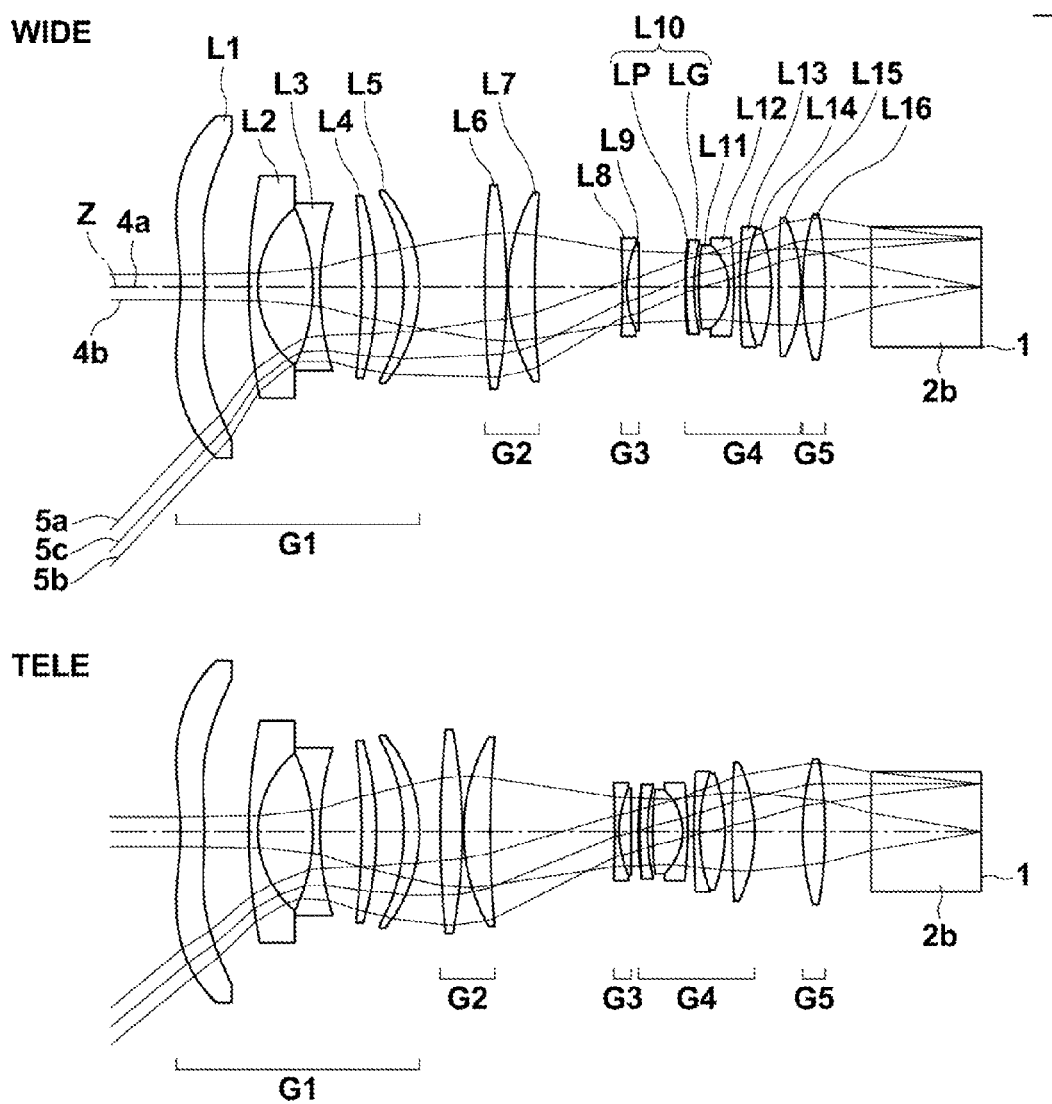
FIG. 9 is a cross-sectional view of a projection lens of Example 7 of the present invention, illustrating a configuration thereof and light rays, in which the upper side illustrates the projection lens in the wide angle end state and the lower side illustrates the projection lens in the telephoto end state.

FIG. 9 shows a cross-sectional view of a projection lens of Example 7, illustrating a configuration thereof and light rays. The projection lens of Example 7 is a zoom lens of five group configuration in which a first lens group G1 to a fifth lens group G5 are disposed in order from the magnification side, and is configured telecentric on the reduction side. In FIG. 9, the upper side denoted as "WIDE" illustrates the projection lens in the wide angle end state while the lower side denoted as "TELE" illustrates the projection lens in the telephoto end state. The first lens group G1 is composed of lenses L1 to L5 in order from the magnification side, the second lens group G2 is composed of lenses L6 and L7 in order from the magnification side, the third lens group G3 is composed of lenses L8 and L9, the fourth lens group G4 is composed of lenses L10 to L15 in order from the magnification side, and the fifth lens group G5 is composed of only a lens L16. The lens L10 is a compound aspherical lens, and is composed of a glass lens LG and a resin layer LP formed on the magnification side surface of the glass lens LG and having an aspherical shape on the magnification side lens surface. FIG. 9 shows an example in which a glass block 2b is disposed on the reduction side of the most reduction side lens.

Figure 16:
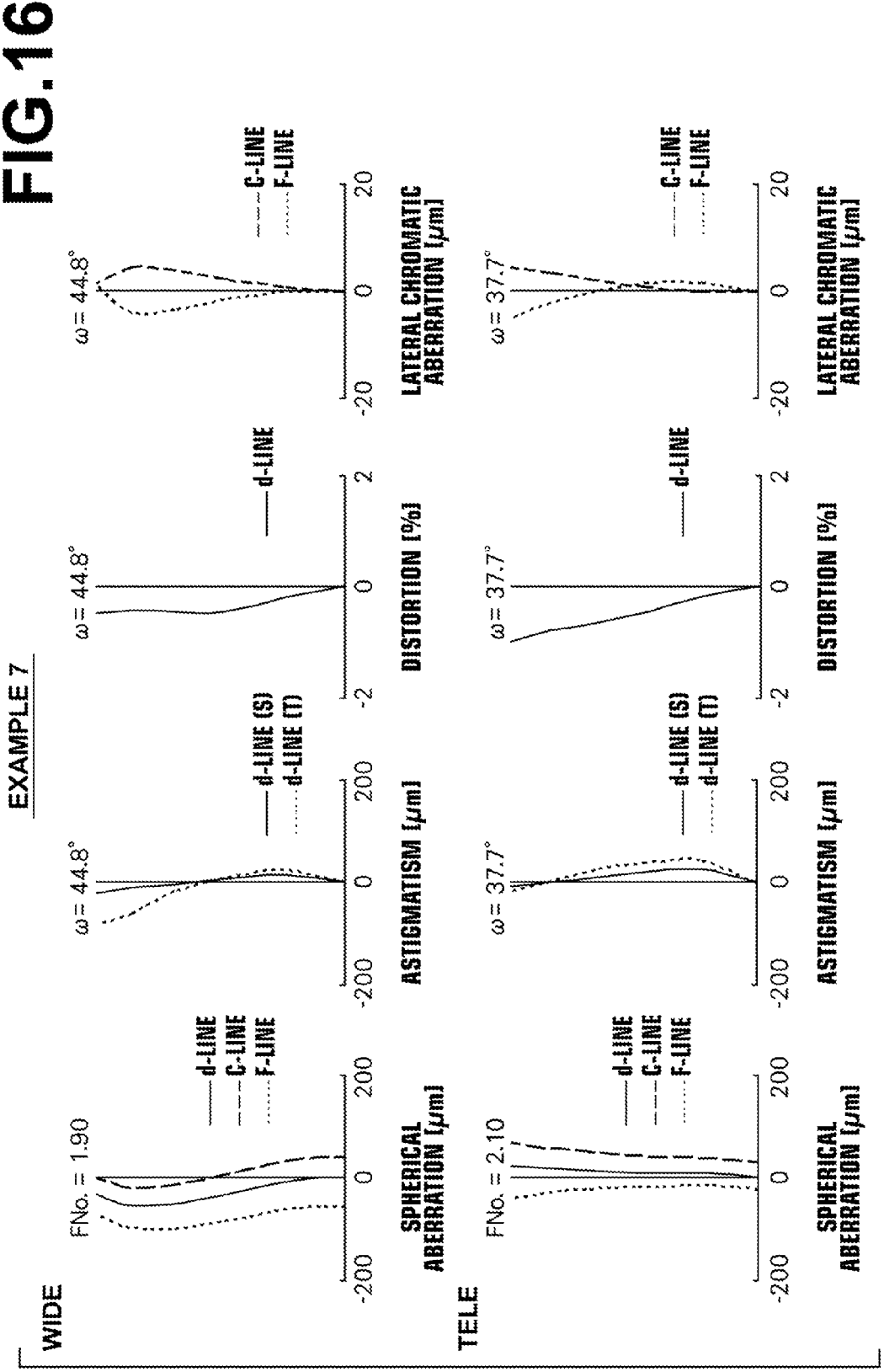
FIG. 16 shows various types of aberrations of the projection lens of Example 7 of the present invention, in which the upper side illustrates those in the wide angle end state and the lower side illustrates those in the telephoto end state, and each state illustrates the diagrams of spherical aberration, astigmatism, distortion, and lateral chromatic aberration, in order from the left.

Tables 19, 20, and 21 respectively show basic lens data, aspherical surface coefficients, and specs, values of variable surface distances, and the like of the projection lens of Example 7. The projection lens of Example 7 may perform focusing by moving only the lens L4 in an optical axis direction. In Tables 19 and 21, a variable surface distance that varies at the time of focusing and/or magnification change is shown using a symbol DD [ ]. Table 21 shows each value in the wide angle end state and in the telephoto end state in a case where the projection distance is infinity, and in the wide angle end state and in the telephoto end state in a case where the magnification ratio is −131.84. FIG. 16 shows each aberration diagram of spherical aberration, astigmatism, distortion, and lateral chromatic aberration of the projection lens of Example 7 in order from the left in a case where the magnification ratio is −131.84. In FIG. 16, the upper side denoted as "WIDE" shows aberrations in the wide angle end state, while the lower side denoted as "TELE" shows aberrations in the telephoto end state.

TABLE 19

Example 7

| Si | Ri | Di | Ndj | vdj |
|---|---|---|---|---|
| *1 | −52.497 | 7.00 | 1.49100 | 57.58 |
| *2 | −87.899 | 13.02 | | |

TABLE 19-continued

Example 7

| Si | Ri | Di | Ndj | vdj |
|---|---|---|---|---|
| 3 | 142.428 | 2.70 | 1.63854 | 55.38 |
| 4 | 26.956 | 16.14 | | |
| 5 | −46.591 | 2.10 | 1.80100 | 34.97 |
| 6 | 73.333 | DD[6] | | |
| 7 | −179.515 | 4.33 | 1.63854 | 55.38 |
| 8 | −81.636 | DD[8] | | |
| 9 | −49.631 | 4.58 | 1.51633 | 64.14 |
| 10 | −39.680 | DD[10] | | |
| 11 | 241.570 | 6.47 | 1.77250 | 49.60 |
| 12 | −141.379 | 0.42 | | |
| 13 | 49.746 | 7.80 | 1.74400 | 44.78 |
| 14 | 254.002 | DD[14] | | |
| 15 | −295.852 | 1.31 | 1.77250 | 49.60 |
| 16 | 27.719 | 3.56 | 1.51633 | 64.14 |
| 17 | ∞ | DD[17] | | |
| *18 | 111.664 | 0.40 | 1.52516 | 53.74 |
| 19 | 111.664 | 2.30 | 1.58144 | 40.75 |
| 20 | 48.395 | 1.42 | | |
| 21 | 78.876 | 8.87 | 1.49700 | 81.54 |
| 22 | −15.000 | 1.50 | 1.83400 | 37.16 |
| 23 | −100.000 | 1.80 | | |
| 24 | 274.240 | 1.71 | 1.80400 | 46.58 |
| 25 | 44.450 | 7.40 | 1.48749 | 70.23 |
| 26 | −44.450 | 2.18 | | |
| 27 | 323.009 | 6.54 | 1.49700 | 81.54 |
| 28 | −42.075 | DD[28] | | |
| 29 | 65.789 | 6.61 | 1.63854 | 55.38 |
| 30 | −105.958 | 13.54 | | |
| 31 | ∞ | 32.30 | 1.51633 | 64.14 |
| 32 | ∞ | | | |

TABLE 20

Example 7

| Si | 1 | 2 |
|---|---|---|
| KA | −5.1830950E−01 | −2.4567065E+00 |
| A3 | 1.1740105E−04 | 1.4159359E−04 |
| A4 | 1.9515149E−05 | 1.4014451E−05 |
| A5 | −6.0807434E−07 | −3.6477687E−07 |
| A6 | 2.2625154E−09 | 6.0185092E−10 |
| A7 | 1.8099245E−10 | 3.0436378E−11 |
| A8 | −1.9899551E−12 | −3.4379279E−13 |
| A9 | −2.4857151E−14 | 1.5889425E−14 |
| A10 | 2.3671210E−16 | 3.5747643E−18 |
| A11 | 5.8648318E−18 | −5.7575460E−18 |
| A12 | −5.1306435E−20 | 3.4105605E−20 |
| A13 | −8.4923716E−25 | −2.5809130E−24 |
| A14 | −3.0591968E−26 | −6.5854131E−26 |
| A15 | −1.4069681E−27 | 1.7527524E−26 |

| Si | 18 |
|---|---|
| KA | 1.0000000E+00 |
| A4 | 8.2906324E−06 |
| A6 | 1.6194405E−08 |
| A8 | 1.3120952E−10 |
| A10 | 1.6334329E−13 |

TABLE 21

Example 7

| | Projection Distance: Infinity | | Magnification Ratio: −131.84 | |
|---|---|---|---|---|
| | Wide Angle End | Telephoto End | Wide Angle End | Telephoto End |
| Zr | 1.0 | 1.3 | 1.0 | 1.3 |
| f | 13.20 | 17.13 | 13.18 | 17.13 |
| Bf | 34.84 | 34.84 | — | — |
| FNo. | 1.90 | 2.10 | 1.90 | 2.10 |
| 2ω | 89.6° | 75.4° | 89.6° | 75.4° |
| DD[6] | 12.19 | 12.19 | 11.37 | 11.63 |
| DD[8] | 8.06 | 8.06 | 10.42 | 9.71 |
| DD[10] | 19.17 | 6.11 | 17.64 | 5.02 |
| DD[14] | 25.69 | 36.56 | 25.69 | 36.56 |
| DD[17] | 13.45 | 2.03 | 13.45 | 2.03 |
| DD[28] | 0.50 | 14.12 | 0.50 | 14.12 |
| exP | Telecentric | | | |

Table 22 shows values of foregoing Examples 1 to 7 corresponding to the conditional expressions (1) to (8) described above and related values. The values shown in Table 22 are those with respect to the d-line. Note that columns of "Example 5_1", "Example 5_2", and "Example 5_3" in Table 22 correspond to the three resin layers LP1 to LP3 of the projection lens of Example 5 respectively. The projection lenses of Examples 1 to 7 described above may be used suitably in a high brightness projection display apparatus, for example, with brightness of 3000 to 7000 lumens.

TABLE 22

| Expression No. | | Example 1 | Example 2 | Example 3 | Example 4 | Example 5_1 | Example 5_2 | Example 5_3 | Example 6 | Example 7 |
|---|---|---|---|---|---|---|---|---|---|---|
| (1) | Tg | 180 | 180 | 180 | 180 | 180 | 180 | 180 | 180 | 180 |
| (2) | $\sqrt{(\Phi Da \cdot |d|)}/\Phi Ds$ | 3.122 | 0.431 | 0.633 | 1.480 | 2.578 | 0.511 | 0.612 | 0.805 | 0.253 |
| (3) | ΦDa/ΦDs | 2.247 | 0.922 | 1.481 | 1.365 | 2.066 | 1.051 | 1.078 | 1.192 | 0.975 |
| (4) | ΦDP | 20.56 | 20.84 | 18.85 | 23.32 | 33.41 | 17.02 | 17.46 | 12.60 | 18.62 |
| (5) | ΦDP/ΦDLmin | 2.247 | 1.000 | 1.019 | 1.229 | 1.964 | 1.001 | 1.026 | 1.193 | 1.000 |
| (6) | Zr · y/(Fmin · f) | 0.885 | 0.557 | 0.644 | 0.648 | 0.550 | 0.550 | 0.550 | 0.627 | 0.654 |
| (7) | Bf/|exP| | 0.574 | | | | | | | 0.529 | |
| (8) | Fmax | 2.650 | 1.788 | 1.619 | 2.185 | 1.680 | 1.680 | 1.680 | 2.593 | 2.098 |
| | Tg | 180 | 180 | 180 | 180 | 180 | 180 | 180 | 180 | 180 |
| | ΦDa | 20.56 | 20.84 | 18.85 | 23.32 | 33.41 | 16.99 | 17.43 | 12.60 | 18.57 |
| | |d| | 39.69 | 4.56 | 3.44 | 27.42 | 52.00 | 4.02 | 5.62 | 5.74 | 1.25 |
| | ΦDs | 9.15 | 22.60 | 12.73 | 17.09 | 16.17 | 16.17 | 16.17 | 10.57 | 19.04 |
| | ΦDP | 20.56 | 20.84 | 18.85 | 23.32 | 33.41 | 17.02 | 17.46 | 12.60 | 18.62 |
| | ΦDLmin | 9.15 | 20.84 | 18.50 | 18.97 | 17.01 | 17.01 | 17.01 | 10.56 | 18.62 |
| | Zr | 1.00 | 1.60 | 1.00 | 1.00 | 1.20 | 1.20 | 1.20 | 1.00 | 1.25 |
| | y | 12.60 | 12.455 | 7.89 | 11.54 | 11.975 | 11.975 | 11.975 | 11.40 | 13.15 |
| | Fmin | 2.650 | 1.580 | 1.619 | 2.185 | 1.630 | 1.630 | 1.630 | 2.593 | 1.904 |
| | f | 5.37 | 22.66 | 7.57 | 8.15 | 16.03 | 16.03 | 16.03 | 7.01 | 13.20 |

TABLE 22-continued

| Expression No. | Example 1 | Example 2 | Example 3 | Example 4 | Example 5_1 | Example 5_2 | Example 5_3 | Example 6 | Example 7 |
|---|---|---|---|---|---|---|---|---|---|
| Bf | 17.80 | 31.42 | 15.79 | 29.33 | 26.72 | 26.72 | 26.72 | 21.16 | 34.84 |
| exP | −31.0 | Telecentric | Telecentric | Telecentric | Telecentric | Telecentric | Telecentric | −40.0 | Telecentric |
| Fmax | 2.650 | 1.788 | 1.619 | 2.185 | 1.680 | 1.680 | 1.680 | 2.593 | 2.098 |

Figure 17:
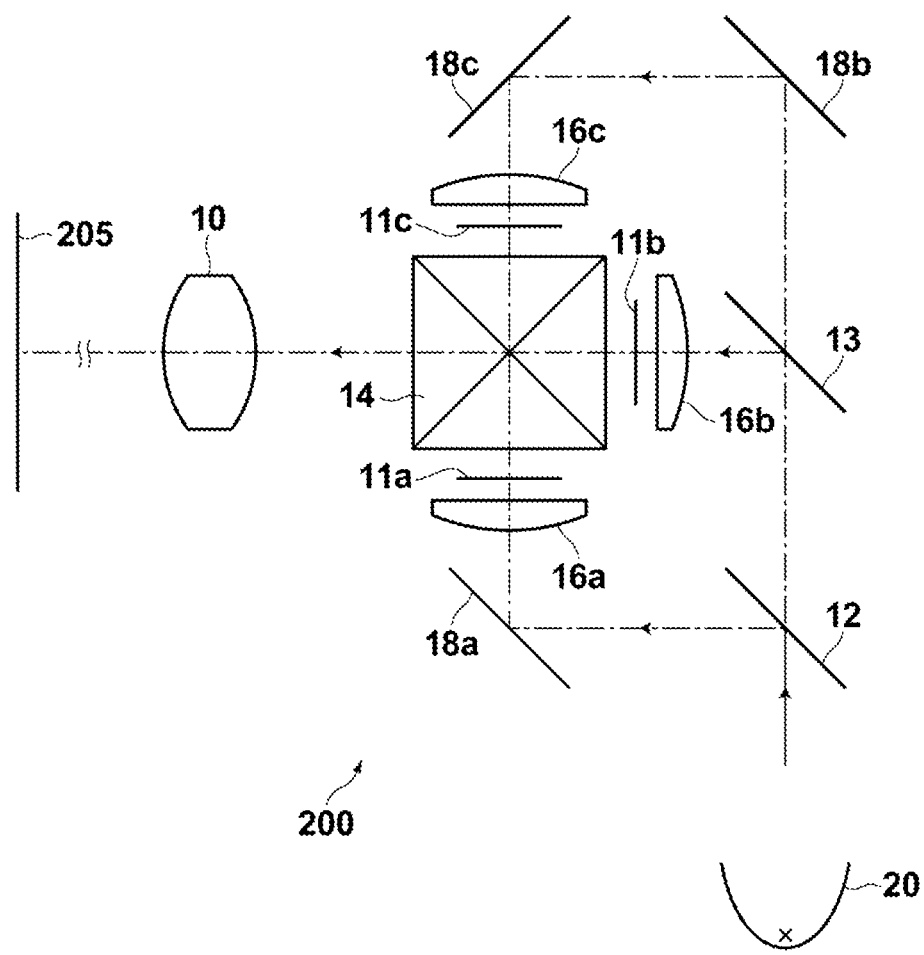
FIG. 17 is a schematic configuration diagram of a projection display apparatus according to another embodiment of the present invention.

A schematic configuration diagram of a projection display apparatus according to an embodiment of the present invention has already been shown in FIG. 3. A schematic configuration diagram of a projection display apparatus according to another embodiment of the present invention is shown in FIG. 17. Examples 1 and 6 may be used suitably in the projection display apparatus shown in FIG. 3, while Examples 2 to 5 and 7 may be used suitably in the projection display apparatus shown in FIG. 17.

The projection display apparatus 200 illustrated in FIG. 17 includes a projection lens 10 according to an embodiment of the present invention, a light source 20, transmissive display elements 11a to 11c as the light valves corresponding to each color light, dichroic mirrors 12, 13 for color separation, a cross-dichroic prism 14 for color combining, condenser lenses 16a to 16c, and total reflection mirrors 18a to 18c for optical path deflection. Note that the projection lens 10 is schematically illustrated in FIG. 17. Although an integrator is disposed between the light source 20 and the dichroic mirror 12, it is omitted in FIG. 17.

White light emitted from the light source 20 is separated into three color light beams (G light, B light, R light) by the dichroic mirrors 12, 13 and inputted to corresponding transmissive display elements 11a to 11c for optical modification via the condenser lenses 16a to 16c. The optically modulated light beams are color-combined by the cross dichroic prism 14 and the color-combined light beam is inputted to the projection lens 10. The projection lens 10 projects an optical image formed by the light optically modulated by the transmissive display elements 11a to 11c onto a screen 205.

So far the present invention has been described by way of embodiments and Examples, but it should be understood that the projection lens of the present invention is not limited to the embodiments and Examples described above, and various changes and modifications may be made. For example, the radius of curvature, surface distance, refractive index, Abbe number, and aspherical surface coefficients of each lens may be changed as appropriate.

Further, the projection display apparatus of the present invention is not limited to those having aforementioned configurations and, for example, the light valve and optical members used for separating or combining light beams are not limited to those having the structures described above, and various changes and modifications may be made to the embodiments.

What is claimed is:

1. A projection lens, comprising a compound aspherical lens in which a resin layer is formed on a surface of a glass lens and a lens surface of the resin layer on the air contacting surface side has an aspherical shape, and satisfying conditional expressions (1) and (2) given below with respect to at least one of the resin layers:

$$150 < Tg < 280 \quad (1)$$

$$\frac{\sqrt{\Phi Da \cdot |d|}}{\Phi Ds} < 3.3 \quad (2)$$

where,

Tg: glass transition temperature of the resin layer in °C.;

ΦDa: effective diameter of the lens surface of the resin layer on the air contacting surface side;

d: distance on the optical axis from the intersection between the outermost off-axis principal ray and the optical axis to the lens surface of the resin layer on the air contacting surface side in a case where the intersection is in the air, or distance on the optical axis from a lens surface closest to the intersection in an optical axis direction to the lens surface of the resin layer on the air contacting surface side in a case where the intersection is not in the air; and ΦDs: twice the axial marginal ray height at the position of the intersection between the outermost off-axis principal ray and the optical axis in a case where the intersection is in the air, or an effective diameter of a lens surface closest to the intersection in an optical axis direction in a case where the intersection is not in the air, in which, in a case where the projection lens is a variable magnification optical system, ΦDa, d, and ΦDs are in a magnification state in which the F-number of the entire system is minimized.

2. The projection lens as claimed in claim 1, wherein the projection lens satisfies a conditional expression (3) given below:

$$\Phi Da/\Phi Ds < 2.5 \quad (3).$$

3. The projection lens as claimed in claim 2, wherein the projection lens satisfies a conditional expression (3') given below:

$$\Phi Da/\Phi Ds < 2.0 \quad (3').$$

4. The projection lens as claimed in claim 1, wherein the projection lens satisfies a conditional expression (4) given below:

$$10 < \Phi DP \quad (4)$$

where,

ΦDP: maximum effective diameter of the lens surface of the resin layer on the air contacting surface side, in millimeter, in which, in a case where the projection lens is a variable magnification optical system, ΦDP is a value in a magnification state in which ΦDP takes a maximum value of those which can be taken by ΦDP.

5. The projection lens as claimed in claim 1, wherein the projection lens satisfies a conditional expression (5) given below:

$$1 \leq \Phi DP/\Phi DLmin < 2.0 \quad (5)$$

where,
- ΦDP: maximum effective diameter of the lens surface of the resin layer on the air contacting surface side, in millimeter; and
- ΦDLmin: minimum effective lens diameter in the entire system,
- in which, in a case where the projection lens is a variable magnification optical system, ΦDP is a value in a magnification state in which ΦDP takes a maximum value of those which can be taken by ΦDP and ΦDLmin is a value in a magnification state in which ΦDLmin takes a minimum value of those which can be taken by ΦDLmin.

6. The projection lens as claimed in claim 5, wherein the projection lens satisfies a conditional expression (5') given below:

$$1 \leq \Phi DP/\Phi DLmin < 1.5 \tag{5'}$$

7. The projection lens as claimed in claim 1, wherein the projection lens satisfies a conditional expression (6) given below:

$$0.4 < Zr \cdot y/(Fmin \cdot f) \tag{6}$$

where,
- Zr: value of 1 in a case where the projection lens is a fixed focus optical system, or zoom ratio in a case where the projection lens is a variable magnification optical system;
- y: maximum image height in a case where the reduction side is taken as the image side;
- Fmin: F-number of the entire system in a case where the projection lens is a fixed focus optical system, or minimum F-number in a case where the projection lens is a variable magnification optical system; and
- f: focal length of the entire system in a case where the projection lens is a fixed focus optical system, or focal length of the entire system at the wide angle end in a case where the projection lens is a variable magnification optical system.

8. The projection lens as claimed in claim 7, wherein the projection lens satisfies a conditional expression (6') given below:

$$0.45 < Zr \cdot y/(Fmin \cdot f) \tag{6'}$$

9. The projection lens as claimed in claim 1, wherein:
the projection lens is a fixed focus optical system; and
the projection lens satisfies a conditional expression (7) given below:

$$0.3 < Bf/|exP| < 1.0 \tag{7}$$

where,
- Bf: air equivalent distance on the optical axis from the most reduction side lens surface to the reduction side focal position of the entire system; and
- exP: distance from the reduction side focal position of the entire system to the reduction side pupil position.

10. The projection lens as claimed in claim 9, wherein the projection lens satisfies a conditional expression (7') given below:

$$0.4 < Bf/|exP| < 1.0 \tag{7'}$$

11. The projection lens as claimed in claim 1, wherein the projection lens satisfies conditional expressions (1') and (2') given below with respect to at least one of the resin layers:

$$160 < Tg < 250 \tag{1'}$$

$$\frac{\sqrt{\Phi Da \cdot |d|}}{\Phi Ds} < 2.0. \tag{2'}$$

12. A projection display apparatus, comprising a light source, a light valve that receives light from the light source, and the projection lens as claimed in claim 1, as a projection lens that projects an optical image formed by light optically modulated by the light valve onto a screen.

* * * * *